United States Patent
Sakashita et al.

(10) Patent No.: US 9,665,150 B2
(45) Date of Patent: May 30, 2017

(54) ELECTRONIC DEVICE WITH A CONTROL CIRCUIT TO DETECT AND ESTABLISH A CONNECTION TO HOST DEVICE

(71) Applicant: SEIKO EPSON CORPORATION, Tokyo (JP)

(72) Inventors: Shinya Sakashita, Shiojiri (JP); Aya Takio, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 77 days.

(21) Appl. No.: 14/724,493

(22) Filed: May 28, 2015

(65) Prior Publication Data
US 2015/0346794 A1 Dec. 3, 2015

(30) Foreign Application Priority Data

May 28, 2014 (JP) .................................. 2014-110292
Jun. 19, 2014 (JP) .................................. 2014-126057
Jun. 19, 2014 (JP) .................................. 2014-126058

(51) Int. Cl.
*G06F 1/00* (2006.01)
*G06F 1/26* (2006.01)
*G06F 1/32* (2006.01)

(52) U.S. Cl.
CPC ............ *G06F 1/266* (2013.01); *G06F 1/3284* (2013.01); *G06F 1/3287* (2013.01); *Y02B 60/1267* (2013.01); *Y02B 60/1282* (2013.01)

(58) Field of Classification Search
None
See application file for complete search history.

(56) References Cited

U.S. PATENT DOCUMENTS

| 7,663,338 | B2* | 2/2010 | Guthrie | ................... G06F 1/263 320/107 |
| 7,847,517 | B2* | 12/2010 | Guthrie | ................... G06F 1/263 320/107 |
| 9,235,249 | B2* | 1/2016 | Bencak | ................... G06F 1/266 |
| 2004/0239294 | A1* | 12/2004 | Veselic | ................... G06F 1/266 320/155 |
| 2007/0028127 | A1* | 2/2007 | Kim | ................... G06F 11/1443 713/310 |
| 2007/0143505 | A1* | 6/2007 | Terrell, II | ............... G06F 1/266 710/10 |
| 2008/0042616 | A1* | 2/2008 | Monks | ................... H04L 12/10 320/106 |

(Continued)

FOREIGN PATENT DOCUMENTS

JP 2012-203765 10/2012

*Primary Examiner* — Nitin Patel
(74) *Attorney, Agent, or Firm* — Workman Nydegger

(57) ABSTRACT

When a control circuit of a printer detects a USB connection with a host device when a power switch is in an on state in an initial state, the control circuit performs an initialization process (enumeration) (a first initialization process) which requests bus power, and performs a USB communication process and charging of a secondary cell after the first initialization process is completed (successful). When the first initialization process fails, the control circuit performs an initialization process requesting self power (a second initialization process), and does not perform charging of the secondary cell. Here, the first initialization process includes a request for a greater supply of power than the second initialization process.

19 Claims, 9 Drawing Sheets

(56) References Cited

U.S. PATENT DOCUMENTS

| | | | | |
|---|---|---|---|---|
| 2008/0126594 A1* | 5/2008 | Monks | .................... | G06F 1/266 |
| | | | | 710/17 |
| 2010/0070659 A1* | 3/2010 | Ma | ........................ | G06F 13/385 |
| | | | | 710/14 |
| 2013/0132614 A1* | 5/2013 | Bajpai | ....................... | G06F 3/00 |
| | | | | 710/10 |
| 2013/0162198 A1* | 6/2013 | Yokota | .................... | H02J 7/007 |
| | | | | 320/107 |
| 2014/0183974 A1* | 7/2014 | Proefrock | ................. | H02J 1/06 |
| | | | | 307/113 |

* cited by examiner

ELECTRONIC DEVICE WITH A CONTROL CIRCUIT TO DETECT AND ESTABLISH A CONNECTION TO HOST DEVICE

The entire disclosure of Japanese Patent Application No.: 2014-110292, filed May 28, 2014, 2014-126057, filed Jun. 19, 2014 and 2014-126058, filed Jun. 19, 2014 are expressly incorporated by reference herein.

BACKGROUND

1. Technical Field

The present invention relates to an electronic device that establishes communication with an external device such as a personal computer (PC) and receives a supply of power from the external device.

2. Related Art

For example, JP-A-2012-203765 discloses a mobile telephone as an example of an electronic device which charges a battery (a rechargeable cell) using a supply of power from a host device when a USB terminal portion is connected to the host device (an example of the external device). The mobile telephone starts an initialization process (enumeration) by performing data transfer between the mobile telephone and the host device via the USB terminal portion, and performs charging of the battery using a first power (for example, a 100 mA current). When the initialization process completes within a predetermined time after the USB terminal portion is connected to the host device, a process is performed based on the initialization process. Meanwhile, when the initialization process does not complete within a predetermined time after the USB terminal portion is connected to the host device, the mobile telephone performs the charging of the battery using a second power (for example, a 500 mA current) which is greater than the first power.

When the initialization process does not complete within the predetermined time, the charging of the battery uses the second power which is greater than the first power. In this case, the host device supplies the second power by artificially removing the connection between the mobile telephone and the host device by setting the potential of a D+ terminal and the potential of a D− terminal to the same potential by causing the electronic device to perform a pull-down.

When the USB terminal portion is connected to a power adapter (an example of a first type device) such as a USB battery charger, the electronic device (the mobile telephone) charges the battery using the power that is supplied from the power adapter.

Incidentally, when the electronic device and the host device perform the charging when a USB connection is realized, a CPU (which configures a control circuit) transmits a request for the second power which is greater than the first power, and also transmits configuration information, which is referred to as a descriptor, including class information (a printer class, for example) to the host device in the initialization process (the enumeration). The host device recognizes which type of device (a printer, for example) the electronic device is based on the class information, and that the electronic device is capable of supplying the second power. The host device then transmits an initialization process completion notification to the electronic device to notify the electronic device of the settings of the configuration information. The electronic device can be charged by receiving the supply of the second power from the host device after the initialization process completion notification is received and the initialization process is completed.

There is a case in which the host device may not be capable of the supply of power using the second power that is requested by the electronic device. An example of this case is when the host device and the electronic device are connected to each other via a hub which operated on bus power. In this case, even if the electronic device transmits the configuration information which includes the second power and the class information in the initialization process, the host device recognizes that the connection is made via a hub which is incapable of the supply of power using the second power, and thus the host device does not set the configuration information. Therefore, the initialization process completion notification (a setting complete notification) (which notifies the electronic device of the setting of the configuration) is not transmitted from the host device to the electronic device. As a result, the electronic device waits for the initialization process completion notification that will not be transmitted from the host device, and the CPU is left in an active state.

For example, there is a case in which the host device is set to only allow the supply of power using a third power of less than a maximum power supply (for example, a current of 500 mA) in order to suppress the consumption of power when the host device is battery driven. When a request is transmitted from the electronic device to this type of host device to request the second power which is greater than the third power, since the host device is not capable of the supplying the power using the second power, the initialization process completion notification is also not transmitted from the host device to the electronic device in this case. Therefore, the electronic device waits for the initialization process completion notification that will not be transmitted from the host device, and thus the CPU is also left in the active state in this case also.

First, description will be given of the problem when the electronic device is connected to the host device in a power-off state. Note that, the host device is assumed to be a second type device such as a PC. In this case, although the supply of power is performed from the host device through a communication cable using the first power (for example, a guaranteed 100 mA current) before the initialization process, the power which is consumed by the CPU of the electronic device is wasted. In particular, if the power that is consumed by the CPU of the electronic device in the state of waiting for the initialization process completion notification is greater than the first power, the remaining capacity of the cell is slowly reduced. There is a problem in that, when the host device is not capable of supplying the power to the electronic device using the second power, the remaining capacity of the cell is slowly reduced by the power consumption of the CPU (or the like) of the control circuit which is activated in a power-off state of the electronic device due to a cause such as one of the two cases that are exemplified above. In other words, there is a problem in that, when the control circuit of the electronic device which is connected to the external device and is activated in a power-off state fails to perform the initialization process with the external device, the electricity (the power) associated with activating the control circuit is wasted.

Next, description will be given of the problem when the electronic device is connected to the host device (a second type device) in a power-on state. In an electronic device described in JP-A-2012-203765, when the initialization process does not complete within the predetermined time after the USB terminal portion is connected to the host device due to a cause such as one of the two cases that are exemplified above, the electronic device can receive a supply of the second power from the host device by artificially removing the connection between the electronic device and the host device by setting the potential of a D+ terminal and the potential of a D− terminal to the same potential by performing a pull-down. However, there is a problem in that, due to the connection between the host device and the electronic device being artificially removed, the host device may not be capable of recognizing which type of device the connection partner (the electronic device) is after connection removal. When the host device is unable to recognize the electronic device, even if the user sends an instruction from the host device to the electronic device, the host device cannot determine whether or not the electronic device of the connection partner is a device for which the process based on the instruction may be performed, and thus cannot cause the electronic device to perform the instructed process. When the electronic device is, for example, a printer, even if the user performs a print instruction from the host device, since the host device does not recognize the electronic device as a printer, the generation and transmission of print data is not performed, and it is not possible to cause the printer to perform the instructed printing. When the electronic device described in JP-A-2012-203765 cannot complete the initialization process with the external device, fails, and cannot establish communication with the external device, while it is possible to receive the supply of the second power, since the external device does not recognize the electronic device, there is a problem in that the electronic device cannot perform a process which the external device should have been capable of instructing if the external device had recognized the electronic device. In this manner, when the electronic device is in the on state, there is a case in which it is necessary to prioritize the establishment of communication between the electronic device and the external device over receiving a supply of the second power from the external device. In other words, there is a problem in that, when the electronic device which is connected to the external device in the power-on state fails to perform the initialization process including the request for power, it is difficult to establish communication with the external device.

In the electronic device described in JP-A-2012-203765, there is a case in which the host device and the electronic device are reconnected with each other in a state in which the connection between the host device and the electronic device is continued. Examples of such a case include 1) a case in which the cell is fully charged with the power off, communication cuts out, the remaining capacity of the cell subsequently falls below a threshold due to discharging, charging becomes necessary again, and reconnection is performed, and 2) a case in which a power adapter is connected during USB charging, communication is disconnected in order to stop the USB charging, the power adapter is subsequently removed, and reconnection is performed in order to start the USB charging again. A case in which reconnection is performed by switching the power between on and off in a state in which the connection between the host device and the electronic device is continued. When the electronic device is a printer, for example, during the switching of the power between on and off, the host device and the electronic device are reconnected in order to perform the initialization process which switches the class of the device to be recognized by the host device from the power-off time class (for example, a HID class), to a power-on time class (for example a printer class).

During reconnection, which is an example of the above cases, the initialization process between the host device and the electronic device is performed. However, in the electronic device described in JP-A-2012-203765, the initialization process which includes a request for the second power is performed for every reconnection. For example, even if the initialization process which is performed before the reconnection fails once without being able to complete within a predetermined time for some reason, the electronic device performs the initialization process which contains the request for the second power that is highly likely to fail in relation to the same host device for which the initialization process already failed once. As a result, the initialization process which has a high likelihood of failing is performed, a predetermined time has to be waited until the initialization process fails, and there is a problem in that electricity is wasted due to the control circuit executing this type of wasteful initialization process. In other words, when the reconnection (which involves the initialization process with the external device) is performed in the state in which the connection with the external device is continued, there is a problem that electricity (power) is wasted by the control circuit of the electronic device.

The problems described above are not limited to electronic devices such as mobile telephones and printers (including multi-function devices), and are generally shared by electronic devices such as scanners, projectors, digital cameras (imaging devices), and audio devices, which perform the initialization process with the host device when connected to the host device (the external device).

SUMMARY

The invention can be realized in the following forms or application examples.

Application Example

According to this application example, there is provided an electronic device which includes a communication circuit which connects to an external device, performs communication, and receives a supply of power, and a control circuit, in which, when the communication circuit connects to the external device in an initial state, it is preferable that the control circuit performs a first initialization process and receives the supply of power from the external device after the first initialization process is completed, and when the first initialization process fails, the control circuit does not receive the supply of power from the external device.

In this case, when the communication circuit connects to the external device in the initial state, the control circuit performs the first initialization process. After the first initialization process is completed, the electronic device receives the supply of power from the external device. Note that, the term "initial state" refers to a state in which the first initialization process is set to be performed according to the initial settings.

Meanwhile, when the first initialization process fails, the electronic device does not receive the supply of power from the external device. In other words, since the charging of the secondary cell which is provided in the inner portion is not performed, it is possible to turn off the power of the control circuit (in particular, the CPU). Accordingly, it is possible to suppress the wasting of electricity and the depletion of the remaining capacity of the secondary cell caused by the control circuit being left in the active state for a long time, even if the first initialization process fails. Therefore, even when the first initialization process fails when connecting to the external device, it is possible to provide an electronic device capable of suppressing the wasting of electricity caused by the activation of the control circuit.

It is preferable that the electronic device according to the application example further includes a power switch, in which, when the power switch is in an off state and the communication circuit connects to the external device, if a partner to which the communication circuit is connected is a first type device, the control circuit performs charging of a chargeable cell using power received by the communication circuit without performing the first initialization process, if the partner to which the communication circuit is connected is a second type device, the control circuit performs the first initialization process and performs charging of the cell after the first initialization process is completed, and if the partner to which the communication circuit is connected is a second type device, when the first initialization process fails, the control circuit does not perform charging of the cell.

In this case, when the power switch is in the off state and the communication circuit connects to the external device, if the partner to which the communication circuit is connected is the first type device, the control circuit does not perform the initialization process, and the charging of the chargeable cell is performed using the power which is received by the communication circuit. If the partner to which the communication circuit is connected is the second type device, the control circuit is activated in the power-on state, the initialization process is performed, and the cell is charged after the initialization process is completed. Meanwhile, when the partner to which the communication circuit is connected is the second type device and the initialization process fails, the charging of the cell is not performed. In other words, when the initialization process fails, it is possible to turn off the control circuit from the active state (the power on state), and it is possible to stop the charging of the cell before the charging starts. Therefore, it is possible to suppress the wasting of electricity and the depletion of the remaining capacity of the cell caused by the control circuit being left in the active state for a long time without the initialization process completing. In other words, even if the control circuit of the electronic device which is connected to the second type device and activated in a power-off state fails to perform the initialization process with the second type device, it is possible to suppress the wasting of electricity and the depletion of the remaining capacity of the cell caused by the activation of the control circuit.

It is preferable that the electronic device according to the application example further includes a power switch, in which, when the power switch is in an on state and the communication circuit connects to the external device, when the first initialization process fails, the control circuit performs a second initialization process and does not receive the supply of power from the external device, and in which the second initialization process includes a request for less power than the first initialization process.

In this case, when the power is in the on state and the first initialization process fails, the control circuit performs the second initialization process which includes a request for less power than the first initialization process.

Accordingly, it is possible to suppress the wasting of power caused by the control circuit performing the first initialization process which has already failed once for the external device which is the same connection partner, and it is possible to start a process early after the reconnection by the amount saved by omitting the first initialization process.

In the electronic device according to the application example, it is preferable that when the communication circuit connects to the external device in an initial state, when the control circuit performs reconnection with the external device in a state in which the first initialization process is completed and the connection with the external device is continued, the control circuit performs the first initialization process and receives the supply of power from the external device after the first initialization process is completed, and when the control circuit performs reconnection with the external device in a state in which the first initialization process fails and the connection with the external device is continued, the control circuit does not perform the first initialization process and does not receive the supply of power from the external device.

In this case, when the reconnection with the external device is performed in a state in which the connection with the external device is continued after the first initialization process is completed, the control circuit performs the first initialization process, and after the first initialization process is completed, the supply of power is received from the external device. Meanwhile, when the reconnection with the external device is performed in a state in which the connection with the external device is continued after the first initialization process fails, the control circuit does not perform the first initialization process, and the supply of power is not received from the external device. Accordingly, it is possible to suppress the wasting of power caused by the control circuit performing the first initialization process when reconnecting to the same external device for which the first initialization process has already failed once.

In the electronic device according to the application example, it is preferable that the control circuit is provided with a determination circuit which determines the partner to which the communication circuit is connected, and a processing circuit which executes at least a portion of the initialization process, when the processing circuit operates, power greater than or equal to the power received by the communication circuit before the initialization process is consumed, when the power switch is in the off state and the communication circuit connects to the external device, the determination circuit operates using the power which is received by the communication circuit before the initialization process and determines the partner to which the communication circuit is connected, if the determination circuit determines that the partner to which the communication circuit is connected is the first type device, the processing circuit is maintained in the power-off state, and if the determination circuit determines that the partner to which the communication circuit is connected is the second type device, the processing circuit is caused to transition to the power-on state.

In this case, when the power switch is in the off state and the communication circuit connects to the external device, the determination circuit operates using the power which is received by the communication circuit before the initialization process and determines the partner to which the communication circuit is connected. If the partner to which the communication circuit is connected is determined to be the first type device, the processing circuit is maintained in the power-off state, and if the partner to which the communication circuit is connected is determined to be the second type device, the processing circuit is caused to transition to the power-on state. Therefore, when the partner to which the communication circuit is connected is the second type device, the processing circuit which transitioned to the power-on state can perform the initialization process with the second type device.

In the electronic device according to the application example, it is preferable that when a timeout occurs in the initialization process with the second type device, the control circuit determines the initialization process to be a failure.

In this case, when a timeout occurs in the initialization process with the second type device, the control circuit determines that the initialization process is a failure. In comparison with a configuration in which the control circuit waits until the completion of the initialization process without considering the timeout, it is possible to shorten the power-on time (activation time) of the control circuit when the initialization process fails. Accordingly, it is possible to suppress the occurrence of a situation in which the control circuit is left in the power-on state (the active state) and the power of the secondary cell is unnecessarily consumed, even though the initialization process fails and it is not possible to charge.

In the electronic device according to the application example, it is preferable that the control circuit determines the initialization process to be a failure due to a signal which should be transmitted periodically from the second type device no longer being transmitted.

In this case, the control circuit determines the initialization process to be a failure due to a signal which should be transmitted periodically from the second type device no longer being transmitted. Accordingly, when the control circuit determines the initialization process to be a failure, it is possible to select not to charge the cell and to set the control circuit to the power-off state. Therefore, it is possible to avoid a situation in which the control circuit is left in the power-on state unable to ascertain the failure of the initialization process. For example, in comparison with a case in which the control circuit determines the occurrence of a timeout to be the failure of the initialization process, it is possible to set the control circuit to the power-off state comparatively early when the initialization process fails. Therefore, it is possible to shorten the power-on time (activation time) of the control circuit when the initialization process fails.

In the electronic device according to the application example, it is preferable that the control circuit sets a timeout time which is used when determining the timeout according to a necessary activation time of the second type device.

In this case, the control circuit sets the timeout time which is used when determining the timeout according to the necessary activation time of the second type device. Accordingly, when the partner to which the communication circuit is connected is the second type device, even if the second type device is in a mid-activation state, it is possible to charge the cell using the power which the communication circuit receives from the second type device by performing the initialization process with the second type device after the activation.

It is preferable that the electronic device according to the application example further includes an operation unit which is operated in order to input data, in which the control circuit sets a timeout time which is used when determining an occurrence of the timeout based on operation of the operation unit.

In this case, the timeout time which is used when the control circuit determines the occurrence of the timeout is set based on the operation of the operation unit. Accordingly, it is possible to set an appropriate timeout time to match the usage environment (the necessary activation time or the like of the second type device which is used) of the user. Therefore, it is possible to reduce the occurrence of an inconvenience in which it is determined that the process times out in the middle of the activation of the second type device due to a timeout time which does not correspond to the necessary activation time of the second type device and is too short being set, and the charging is not performed regardless of the fact that it is possible to perform the charging. Therefore, it is possible to increase the frequency with which the cell is charged.

In the electronic device according to the application example, it is preferable that when the external device which is connected to the communication circuit is the second type device, the control circuit acquires a necessary activation time of the second type device and sets a timeout time which is used when determining an occurrence of the timeout to a value corresponding to the necessary activation time.

In this case, when the control circuit is connected to the second type device, the control circuit acquires the necessary activation time of the second type device and sets the timeout time according to the necessary activation time. Accordingly, it is possible to set an appropriate timeout time to match the usage environment (the necessary activation time or the like of the second type device which is used) of the user. Therefore, it is possible to reduce the occurrence of an inconvenience in which the process times out in the middle of the activation of the second type device due to a timeout time which does not correspond to the necessary activation time of the second type device and is too short being used, and the charging is not performed regardless of the fact that it is possible to perform the charging. Therefore, it is possible to increase the frequency with which the cell is charged.

In the electronic device according to the application example, it is preferable that the control circuit measures a value indicating a remaining capacity or a change in the remaining capacity of the cell, and, when the value indicating the remaining capacity or the change in the remaining capacity of the cell exceeds a threshold, the control circuit determines the initialization process to be a failure.

In this case, since the control circuit determines the initialization process to be a failure based on the fact that a value which indicates the remaining capacity or the change in the remaining capacity of the cell has exceeded a threshold, it is possible to determine that the initialization process is a failure, even without using a time measurement unit such as a timer, or, even without monitoring the signals which should be transmitted from the second type device.

It is preferable that the electronic device according to the application example further includes a power switch, in which the connection with the external device is performed with the power switch in an on state, and in which, when the first initialization process fails, the control circuit performs a second initialization process and the first initialization process includes a request for a supply of power which is greater than in the second initialization process without receiving the supply of power from the external device, in which, when a connection with the external device is continued after performing the second initialization process, the control circuit performs the second initialization process without performing the first initialization process, and in which, when the control circuit connects to the external device after the connection with the external device cuts out after performing the second initialization process, the control circuit returns to an initial state and starts the first initialization process.

In this case, after performing the second initialization process, when the connection with the external device is continued, the control circuit performs the second initialization process without performing the first initialization process. When the external device is the same connection partner for which the first initialization process has failed once in this manner, the second initialization process is performed without performing the first initialization process. Therefore, it is possible to suppress the wasting of power caused by the control circuit performing the first initialization process with the same external device for which the first initialization process has already failed once. Meanwhile, after performing the second initialization process, when the control circuit connects to the external device after the connection with the external device cuts out, the control circuit returns to the initial state and performs the first initialization process. When there is a likelihood that the connection partner of the control circuit is the external device which differs from an external device for which the first initialization process has already failed once, the control circuit returns to the initial state, and the first initialization process is performed. At this time, if the first initialization process succeeds, it is possible to receive the supply of power from the external device.

In the electronic device according to the application example, it is preferable that when the power switch is turned off in a state in which the connection with the external device is continued after the first initialization process is completed, the control circuit performs the first initialization process, subsequently receives the supply of power from the external device and performs charging of the cell after the first initialization process is completed, and, when the first initialization process fails, the control circuit does not perform charging of the cell, and meanwhile, when the power switch is turned off in a state in which the connection with the external device is continued after performing the second initialization process, the control circuit does not charge the cell by not performing the first initialization process.

In this case, after the first initialization process is completed, when the power switch is turned off in a state in which the connection with the external device is continued, the control circuit performs the first initialization process, and after the first initialization process is completed, performs the charging of the chargeable cell. In this manner, in the power-on state, the first initialization process is performed with the same external device for which the first initialization process succeeded after the power is turned off. Therefore, if the first initialization process is completed, cell is charged, and if the first initialization process fails, the charging of the cell is not performed. Meanwhile, after the second initialization process is performed, when the power switch is turned off in a state in which the connection with the external device is continued, the control circuit does not perform the first initialization process, and does not perform the charging of the cell. In this manner, when the first initialization process fails in the power-on state and the second initialization process is performed, the charging of the cell is not performed by not performing the first initialization process with the same external device for which the first initialization process fails after the power is turned off. Accordingly, when the power switch is turned off, it is possible to suppress the wasting of power caused by the control circuit performing the first initialization process with the same external device for which the first initialization process has already failed once.

In the electronic device according to the application example, it is preferable that the control circuit is provided with a non-volatile memory which stores a value indicating either success in which completion of the first initialization process is achieved, or failure in which completion of the first initialization process is not achieved and the second initialization process is performed, when the power switch is in an off state before being turned on, and, if the value stored in the non-volatile memory is a value indicating success after the power switch is turned on, the control circuit performs the first initialization process, and if the value stored in the non-volatile memory is a value indicating failure, the control circuit performs the second initialization process without performing the first initialization process, and the control circuit does not receive the supply of power from the external device.

In this case, a value indicating success in which completion of the first initialization process which is performed in the off state before the power switch is turned on is achieved, or indicating failure in which completion of the first initialization process is not achieved and the second initialization process is performed is stored in the non-volatile memory by the control circuit. If the value stored in the non-volatile memory is a value indicating success after the power switch is turned on, the first initialization process is performed by the control circuit. Meanwhile, if the value stored in the non-volatile memory is a value indicating failure, the second initialization process is performed by the control circuit without performing the first initialization process, and the control circuit does not receive the supply of power from the external device. Accordingly, when the power switch is turned on in a state in which the connection with the external device is continued after the first initialization process fails, it is possible to suppress the wasting of power caused by the control circuit performing the first initialization process with the same external device for which the process has already failed once in the power-off state.

In the electronic device according to the application example, it is preferable that when a timeout occurs in the first initialization process, it is preferable that the control circuit determines the first initialization process to be a failure.

In this case, when a timeout occurs in the first initialization process with the external device, the control circuit determines that the first initialization process is a failure. Since it is possible to perform the second initialization process early in comparison with a configuration in which the control circuit waits until the completion of the first initialization process without considering the timeout, it is possible to establish the communication between the external device and the electronic device early.

In the electronic device according to the application example, it is preferable that the control circuit sets a timeout time which is used when determining the timeout such that a value when the power switch is in the on state is shorter than a value when the power switch is in the off state.

In this case, the timeout time is set such that the value when the power switch is in the on state is shorter than the value when the power switch is in the off state. Accordingly, it is possible to increase the frequency with which the cell is charged in the power-off state, and it is possible to suppress a delay in starting the process which the user instructs from the external device in the power-on state to a short delay.

In the electronic device according to the application example, it is preferable that charging of a cell is performed using the supply of power which is received from the external device.

In this case, it is possible to perform charging of the cell using the supply of power which is received from the external device.

In the electronic device according to the application example, it is preferable that when the control circuit connects to the external device after a connection with the external device cuts out, the control circuit returns to the initial state and starts the first initialization process regardless of whether the first initialization process completes or fails before the connection with the external device cuts out.

In this case, when the control circuit connects to the external device after the connection with the external device cuts out, the control circuit returns to the initial state and starts the first initialization process regardless of whether the first initialization process completes or fails before the connection cuts out. Here, when the control circuit connects to the external device after the connection with the external device cuts out, there is a likelihood that the external device which is the connection partner is different from the external device before the connection cuts out (a likelihood that the first initialization process succeeds). In this case, the control circuit returns to the initial state and the first initialization process is performed If the first initialization process succeeds, it is possible to receive the supply of power from the external device, even if the first initialization process with the external device which is connected before the connection cuts out fails and the supply of power is not received from the external device until that point. For example, it is possible to avoid not performing the first initialization process and missing an opportunity to receive the supply of power from the external device, even though there is a likelihood that the connection with the external device for which the first initialization process failed will cut off and the external device which is connected next is different from the external device until that point.

It is preferable that the electronic device according to the application example further includes a power switch, in which, if the power switch is in an on state, the control circuit performs the first initialization process as a first type device, and, if the power switch is in the off state, the control circuit performs the first initialization process as a second type device which differs from the first type device.

In this case, if the power is in the on state, the control circuit performs the first initialization process as a first type device (for example, a first class device such as the printer class). Meanwhile, if the power is in the off state, the control circuit performs the first initialization process as a second type device (for example, a second class device such as the human interface device (HID) class) which differs from the first type device. Accordingly, the external device recognizes the electronic device which is the connection partner as a first type device if the power is in the on state, and treats the electronic device as the first type device. Meanwhile, the external device recognizes the electronic device which is the connection partner as a second type device if the power is in the off state, and treats the electronic device as the second type device. Accordingly, it is possible to avoid the occurrence of an inconvenience caused by erroneous recognition in which the connection partner which is in the power-on state is treated as the second type device, the connection partner which is in the power-off state is treated as the first type device, or the like.

In the electronic device according to the application example, it is preferable that when a reconnection with the external device is performed in a state in which the connection with the external device is continued after the second initialization process completes, if the power is in the on state, the control circuit performs the second initialization process without performing the first initialization process.

In this case, when the power is in the on state and the first initialization process fails, the control circuit performs the second initialization process which includes a request for less power than the first initialization process. When the reconnection with the external device is performed in a state in which the connection with the external device is continued after the second initialization process completes, if the power is in the on state, the second initialization process is performed without performing the first initialization process. Accordingly, it is possible to suppress the wasting of power caused by the control circuit performing the first initialization process which has already failed once for the external device which is the same connection partner, and it is possible to start a process early after the reconnection by the amount saved by omitting the first initialization process.

BRIEF DESCRIPTION OF THE DRAWINGS

The invention will be described with reference to the accompanying drawings, wherein like numbers reference like elements.

FIG. 10 is a flowchart illustrating a USB communication process when the power is on.

DESCRIPTION OF EXEMPLARY EMBODIMENTS

Figure 1:
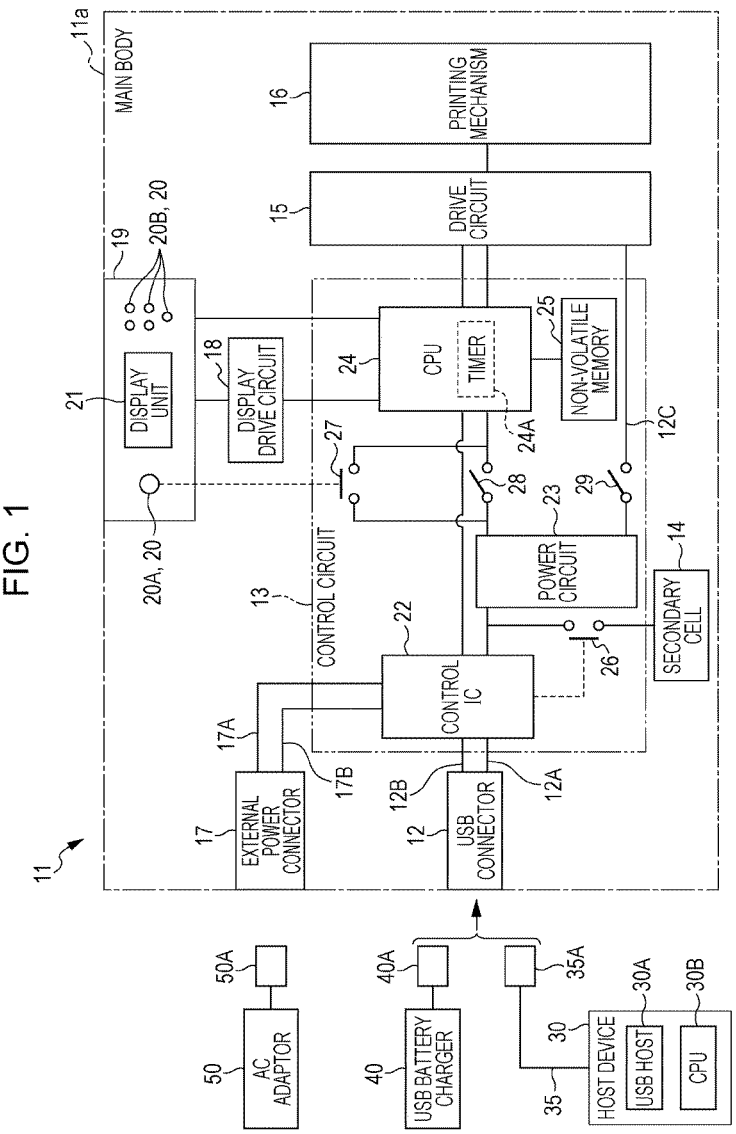
FIG. 1 is a schematic diagram illustrating the electrical configuration of a printer and a host device in a first embodiment.

Hereinafter, description will be given of an embodiment of a printing system with reference to the drawings. As illustrated in FIG. 1, a printer 11 (a printing device) which is an example of the electronic device functions as a USB device 11A (refer to FIG. 4) in the universal serial bus (USB) standard. The printer 11 illustrated in FIG. 1 is provided with a USB connector 12 into (and out of) which a connector 35A (a terminal) can be inserted (or removed) in order to connect to a host device 30 which functions as a USB host 30A so as to be capable of communication through a USB cable 35 which is an example of a communication cable. The USB connector 12 is provided with power lines (P and G) which serve as power supply paths, and data lines (D+ and D−) for transmitting and receiving data. When the connector 35A of the USB cable 35 is connected to the USB connector 12, the data lines and the power lines of the same polarity are connected to each other, respectively, and the transmission and reception of data with the host device 30 and the supply of power from the host device 30 become possible. The USB connector 12 includes an electrical circuit for communication including the power lines, the data lines, and various elements (for example, resistors). In this respect, in the present embodiment, the USB connector 12 forms an example of the communication circuit.

While the host device 30 is formed of a personal computer (PC), for example, the host device 30 may be a type of computer such as a portable information terminal (personal digital assistant (PDA)) or a tablet PC as long as the host device 30 functions as the USB host 30A. The host device 30 may be a printer including a USB host function. The host device 30 is provided with the USB host 30A and a CPU 30B which are illustrated in FIG. 1. At least a portion of the software portion of the USB host 30A is constructed by, for example, the CPU 30B executing a USB program. Note that, in the present embodiment, USB 2.0 is used as the USB standard, for example.

As illustrated in FIG. 1, the printer 11 is provided with the USB connector 12, and a control circuit 13 which is connected by a power supply path 12A and data lines 12B. The printer 11 is provided with a secondary cell 14, a drive circuit 15, and a printing mechanism 16. The secondary cell 14 is an example of a rechargeable cell for which charge control is performed by the control circuit 13, the drive circuit 15 receives instructions from the control circuit 13, and the printing mechanism 16 is controlled by the instructions of the control circuit 13 via the drive circuit 15.

As illustrated in FIG. 1, a connector 40A (a terminal) of a USB battery charger 40 (a power adapter) for charging is connected to the USB connector 12 to be possible to insert therein and remove therefrom. In addition to the USB connector 12, the printer 11 is provided with an external power connector 17 for supplying auxiliary power. The external power connector 17 is connected to the control circuit 13 through a power supply path 17A and data lines 17B. A connector 50A (a terminal) of an AC adapter 50 (a power adapter) is connected to the external power connector 17 to be possible to insert therein and remove therefrom. The connector 50A of the AC adapter 50 has a similar cylindrical shape to the shape of a connector of another general AC adapter. Note that, in the present embodiment, the host device 30 and the USB battery charger 40 form an example of the external device. In particular, the host device 30 forms an example of the external device which perform the initialization process (described later). The USB battery charger 40 forms an example of a first device, and the host device 30 forms an example of a second device.

As illustrated in FIG. 1, an operation panel 19 is provided on a main body 11a of the printer 11. The operation panel 19 is provided with an operation switch group 20, and a display unit 21. The operation switch group 20 is operated in order to input various instructions and the like to the printer 11, and the display unit 21 displays various menus, messages of the operational state, and the like. The operation switch group 20 is electrically connected to the control circuit 13. The display unit 21 is electrically connected to the control circuit 13 via a display drive circuit 18.

The operation switch group 20 is provided with a power switch 20A, and operation switches 20B. The operation switches 20B are operated in order to input data by the input of various instructions, selection operations, and the like. The power of the printer 11 is switched between on and off by operating the power switch 20A. In other words, when the power switch 20A is operated in the power-off state, and the power switch 20A is operated, the printer 11 switches to the power-on state. Conversely, when the power switch 20A is operated in the power-on state, and the power switch 20A is operated, the printer 11 switches to the power-off state. For example, a user operates the operation switches 20B in the menu which is displayed on the display unit 21 and selects various items. Consequently, the control circuit 13 receives the selection result and sets the printing conditions and the like.

When the partner to which the USB connector 12 is connected is the host device 30 or the USB battery charger 40 while the power of the printer 11 is off, the control circuit 13 enters a charging mode, and manages charge control in which the secondary cell 14 is charged using the power that is supplies from the host device 30 or the USB battery charger 40 through the USB connector 12. However, when the AC adapter 50 is connected to the external power connector 17 while the power of the printer 11 is off, the control circuit 13 prioritizes the charging of the secondary cell 14 using the power that is supplied from the AC adapter 50 and does not perform the charging based on the power that is supplied from the host device 30 or the USB battery charger 40.

The control circuit 13 manages print control in which a document or an image is printed to a printing medium (such as paper) based on print job data which is received from the host device 30 while the power of the printer 11 is on. When the AC adapter 50 is connected to the external power connector 17 while the power of the printer 11 is on, the printer 11 operates using the power that is supplied from the AC adapter 50. In the power-on state of the printer 11 in which the AC adapter 50 is not connected to the external power connector 17, if the partner to which the USB connector 12 is connected is the host device 30, the printer 11 operates using the power that is supplied from the host device 30. In the power-on state, if the partner to which the USB connector 12 is connected is the USB battery charger 40, the printer 11 operates using the power that is supplied from the USB battery charger 40.

In the present embodiment, in the power-on state, surplus power (that is not used in the operation of the printer 11) of the power that is supplied from the host device 30 or the USB battery charger 40 is used to charge the secondary cell 14. Naturally, a configuration may be adopted in which the printer 11 may be set to a non-charging mode in the power-on state, and the power that is supplied from the external device is used in the operation of the printer 11 and not used in the charging of the secondary cell 14.

The printing mechanism 16 of the present embodiment is provided with a print head (not shown) and a transport device (not shown). The print head prints on a printing medium (such as paper) using an ink, and the transport device transports the printing medium. The print head may adopt a serial system in which printing is performed while reciprocally moving the print head in a scanning direction which intersects a transport direction of the printing medium, and may adopt a line head system in which printing is performed on the printing medium which is transported at a fixed rate using a long print head or a head group capable of printing a printing width in a width direction which intersects the transport direction at once. The system of the print head may be any one of an ink jet system, a dot impact system, and an electronic photographic system. When the ink jet system is adopted, it is possible to use a piezoelectric element, a static element, or a bubble element as the drive element which generates a pressure which ejects an ink. The piezoelectric element or the static element generates a pressure by causing a plate portion which forms a chamber communicating with a nozzle to bend, and the bubble element generates bubbles almost instantaneously using heat or the like. The printer 11 may be capable of receiving the print job data used in the printing by communication from the host device 30 in a wired or wireless manner, and will read data used in the printing from a storage medium such as a memory card.

As illustrated in FIG. 1, the control circuit 13 is provided with a control IC 22, a power circuit 23, a CPU 24, and a non-volatile memory 25. The control IC 22 is an integrated circuit which performs the charge control. Here, Here, in addition to the CPU 24 inside the control circuit 13, an application specific IC (ASIC) may be provided, and the control of a portion of the printing mechanism 16 (for example, the print head) may be performed by the ASIC. Various programs which are necessary for the control of the printer 11, various setting data which is necessary to store even when the power of the printer 11 is on, and the like are stored in the non-volatile memory 25. Note that, the printer 11 is also provided with RAM (not shown) in which programs, when executed by the CPU 24, various data that is necessary, and the like are temporarily stored.

The power supply path 12A and the data lines 12B of the USB connector 12 are connected to the control IC 22 inside the control circuit 13. The power supply path 17A and the data lines 17B of the external power connector 17 are also connected to the control IC 22. The control IC 22 has a connection detection function and a distinction function. The connection detection function detects a connection of the external device to the USB connector 12 and the external power connector 17, and the distinction function distinguishes the connection partner (the external device) which is detected. The control IC 22 performs the charge control in which the secondary cell 14 is charged in a charging mode, performs management of the power supply paths 12A and 17A which supply power to the CPU 24, the drive circuit 15, and the like, and performs the management of the data lines 12B and 17B which transmit data to the CPU 24 and the like.

When one of the connector 35A of the USB cable 35 from the host device 30 and the connector 40A of the USB battery charger 40 is connected to the USB connector 12, the control IC 22 detects a USB connection. When the control IC 22 detects a USB connection, for example, with regard to the data lines 12B (D+ and D−), when (D+)≠(D−) (different potentials), the control IC 22 determines that the USB connector 12 is connected to the host device 30 which is a type of computer. Meanwhile, when (D+)=(D−) (same potential), the control IC 22 determines that the USB connector 12 is connected to the USB battery charger 40. In other words, the control IC 22 is capable of determining whether the connection partner (connection destination) to which the USB connector 12 is connected is the host device 30 or the USB battery charger 40. In this respect, in the present embodiment, the control IC 22 forms an example of the determination circuit which determines the connection partner. Note that, the control IC 22 may determine the connection partner using another determination method.

The power circuit 23 is interposed in series at a portion of the power supply path 12A between the control IC 22 and the CPU 24. The power circuit 23 transforms a direct current voltage which is input as necessary, and generates a drive voltage (for example, a predetermined voltage in a range of 3 V to 6 V) which is necessary for the control IC 22 and the CPU 24, a drive voltage which is necessary for the driving of the print head in the printing mechanism 16, a drive voltage which is necessary for the driving of the transport motor which serves as the power source of the transport device which transports the printing medium, and the like. The secondary cell 14 is connected to a portion of the power supply path 12A which connects the control IC 22 to the power circuit 23 via a first switch 26. The first switch 26 is controlled to turn on and off by the control IC 22. When the first switch 26 is turned on and is conductive, the secondary cell 14 is charged using the power from the power supply path 12A.

A push type second switch 27 and a third switch 28 which is formed of a semiconductor switch are connected parallel to each other and are interposed at a portion of the power supply path 12A between the power circuit 23 and the CPU 24. The push type second switch 27 is mechanically pushed downward in conjunction with the operation of the power switch 20A, the power switch 20A is on only during operation, and when the operation of the power switch 20A is stopped, the power switch 20A turns off. A fourth switch 29 is interposed between the power circuit 23 and the drive circuit 15 on a power supply path 12C which connects the power circuit 23 to the drive circuit 15.

Based on the determination results, the control IC 22 controls the switching between on (conductive) and off (non-conductive) of the third switch 28, the switching between on (conductive) and off (non-conductive) of a switch (not shown) on the data lines 12B, and the switching between on (conductive) and off (non-conductive) of the first switch 26.

The push type second switch 27 is used as a trigger to activate the printer 11, and when the second switch 27 is turned on by the user pressing the power switch 20A while the printer 11 is in the power-off state, the control IC 22 activates the on state of the third switch 28. Specifically, when an on signal is input to the CPU 24 when the push type second switch 27 is turned on, the CPU 24 instructs the control IC 22 to switch the power of the printer 11 between on and off. When the control IC 22 receives the instruction to switch the power from the CPU 24 while the printer 11 is in the power-off state, the control IC 22 turns the third switch 28 and the fourth switch 29 on. Meanwhile, when the control IC 22 receives the instruction to switch the power from the CPU 24 while the printer 11 is in the power-on state, the control IC 22 turns off the third switch 28 and the fourth switch 29.

The necessary power is supplied from the power circuit 23 to the CPU 24 by the third switch 28 being turned on, and the supply of power from the power circuit 23 to the CPU 24 is disconnected by the third switch 28 being turned off. The necessary power is supplied from the power circuit 23 to the drive circuit 15 by the fourth switch 29 being turned on, and the supply of power from the power circuit 23 to the drive circuit 15 is disconnected by the fourth switch 29 being turned off. Note that, the fourth switch 29 may be configured by a switch group which is formed of a plurality of switches which are provided for distinct voltages to be supplied to the drive circuit 15.

In the power-off state of the printer 11, the third switch 28 and the fourth switch 29 are both in the off state. In the power-off state, the AC adapter 50 is not connected to the external power connector 17, and if neither the host device 30 nor the USB battery charger 40 is connected to the USB connector 12, the first switch 26 is in the off state.

If the printer 11 is in the power-off state, the AC adapter 50 is in a non-connected state, the connection destination is the host device 30 (the USB host 30A) when the USB connection to the USB connector 12 is detected, and if it is necessary to charge the secondary cell 14 at this time, the control IC 22 turns on the third switch 28, which is in the off state until this point. The control IC 22 activates the CPU 24 by turning on the third switch 28 in order to cause the CPU 24 to execute the initialization process, which is referred to as enumeration, between the printer 11 and the host device 30 before charging the secondary cell 14. At this time, the control IC 22 causes the CPU 24 to assume a state in which the CPU 24 can transmit and receive data through the data lines 12B by turning on a switch on the inside of the control IC 22.

When the USB connector 12 is connected to the host device 30, the first power (for example, a guaranteed current of 100 mA) is supplied from the host device 30. By performing the initialization process, the CPU 24 consumes more power than the first power that is received from the USB connector 12. Therefore, when the CPU 24 is left in a standby state in the middle of the initialization process without receiving the initialization process completion notification from the host device 30, the remaining capacity of the secondary cell 14 is depleted due to the power consumption while the CPU 24 is active in the standby state. Here, in the USB standard, guaranteed power is the power that the USB host has to supply to a USB device that is connected thereto by USB, and in the USB standard, the current is defined as 100 mA, for example.

Note that, in this embodiment, when a USB connection is realized between the printer 11 and the host device 30 while the power of the printer 11 is off, the activation of the CPU 24 in order to cause the CPU 24 to perform the initialization process that is necessary for the charging of the secondary cell 14 is referred to as a "charging activation". The control IC 22 turning on the third switch 28 and activating the CPU 24 is referred to as "charging activation on", and the control IC 22 turning off the third switch 28 and turning off the power of the CPU 24 while the CPU 24 is active for charging is referred to as "charging activation off".

When the printer 11 is connected to a power adapter such as the AC adapter 50 or the USB battery charger 40 while in the power-on state, the control IC 22 causes the CPU 24 and the drive circuit 15 to operate using the power that is supplied from the power adapter by setting the first switch 26, the third switch 28, and the fourth switch 29 to the on state. At this time, if there is surplus power which is not used in the operation of the printer 11 of the power that is supplied from the power adapter, the secondary cell 14 is charged using the surplus power. Meanwhile, when the printer 11 is connected to the AC adapter 50 or the USB battery charger 40 while in the power-off state, the control IC 22 charges the secondary cell 14 using the power that is supplied from the power adapter by setting the first switch 26 to be on, and turning the third switch 28, and the fourth switch 29 to the off state.

When the control IC 22 charges the secondary cell 14 using the power from the AC adapter 50 or the USB battery charger 40, since it is not necessary to perform the initialization process, the CPU 24 is not activated. Note that, the USB battery charger 40 and the AC adapter 50 are not limited to devices which are connected to an AC power outlet, and include devices which are connected to a DC battery.

A USB communication program for performing the initialization process, which is referred to as enumeration, including the negotiation of power supply capability with the host device 30 is stored in the non-volatile memory 25 which is connected to the CPU 24. When the connection of the host device 30 to the USB connector 12 is detected, the CPU 24 performs the initialization process (the enumeration) with the host device 30. In the present embodiment, the CPU 24 executes the entirety of the initialization process; however, a configuration may be adopted in which the CPU 24 executes a portion of the initialization process, and the other portion is executed by an ASIC or the control IC 22.

Note that, in the present embodiment, the CPU 24 forms an example of a processing circuit which executes at least a portion of the initialization process.

As illustrated in FIG. 1, the CPU 24 is provided with a timer 24A. The timer 24A is formed of a counter within the CPU 24, for example, and functions as a timer by counting pulses of a clock signal. The CPU 24 causes the timer 24A to measure the elapsed time from the point in time at which the CPU 24 is activated as a measured time T. A set timeout time T1 (hereinafter also referred to simply as the "timeout time T1") which is used when determining whether or not the initialization process failed is stored in the non-volatile memory 25. When the measured time T of the timer 24A reaches the timeout time T1 and the process times out without the CPU 24 receiving the initialization process completion notification from the host device 30, the CPU 24 stops the initialization process before starting the charging by instructing the control IC 22 to turn off the power. On the other hand, when the CPU 24 receives the initialization process completion notification from the host device 30 before the measured time T of the timer 24A reaches the timeout time T1, the CPU 24 starts the charging process in which the secondary cell 14 is charged using the power from the host device 30 by instructing the control IC 22 to start charging and to turn on the first switch 26. Note that, the timer 24A may be formed of software which performs the time measurement process using a program, and may be provided in the control IC 22 or an ASIC instead of the CPU 24.

Here, the timeout time T1 is set to a value which is equal to or greater than a basic input-output system (BIOS) necessary activation time of the host device 30 which has the longest BIOS necessary activation time of plural types of the host device 30 anticipated to be used, and is equal to or less than a time obtained by adding a margin time to the BIOS necessary activation time of the host device 30. Here, the margin time can be set as appropriate; however, for example, it is preferable to set the margin time to 10% or less of the BIOS necessary activation time. The timeout time T1 is set to a predetermined value within a range of 30 seconds to 120 seconds, for example. Naturally, the timeout time T1 is not limited to the range described above, and can be set to a shorter time such as 10 seconds or 20 seconds, or to a longer time such as 3 minutes or 5 minutes, either related to the BIOS necessary activation time or unrelated to the BIOS necessary activation time.

Figure 2:
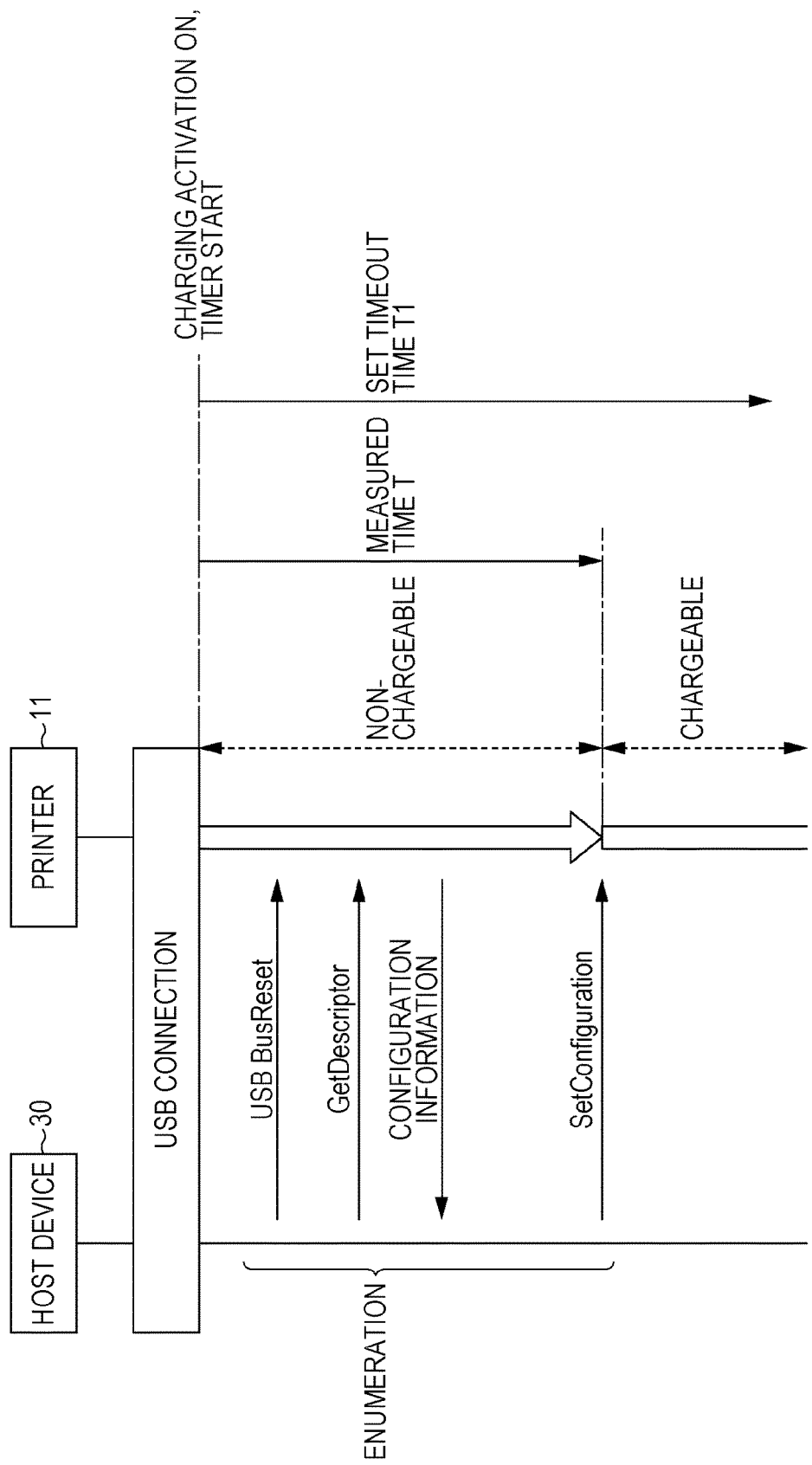
FIG. 2 is a sequence diagram of when an initialization process between the host device and the printer is successful.
Figure 3:
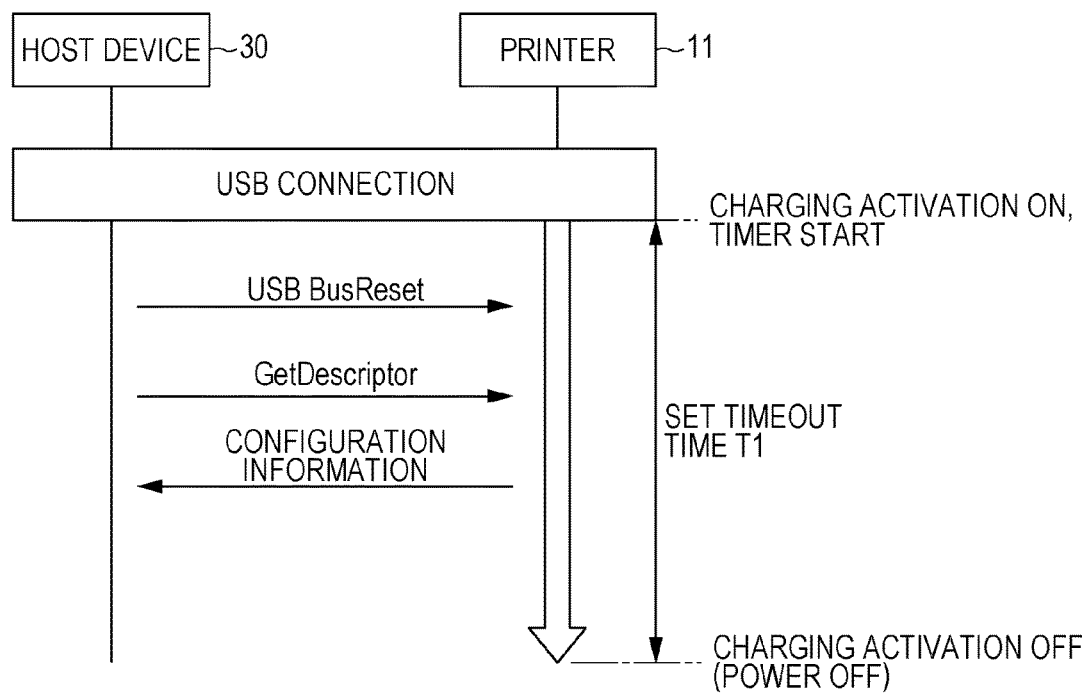
FIG. 3 is a sequence diagram of when the initialization process between the host device and the printer fails.

Next, description will be given of the enumeration which is executed as the initialization process in order to establish a communication connection state between the printer 11 and the host device 30, and the timeout process which is performed by the timer 24A, with reference to FIGS. 2 and 3. Note that, FIGS. 2 and 3 illustrate an example of the initialization process when the USB connection is realized in the power-off state. However, the initialization process when the USB connection is realized in the power-on state is essentially the same. However, it is preferable to set the timeout time T1 such that the initialization process when the power is on is shorter than the initialization process when the power is off.

As illustrated in FIG. 2, when the USB connection between the printer 11 and the host device 30 is realized, the enumeration is executed as the initialization process between the host device 30 and the printer 11 between which the USB connection is detected.

As illustrated in FIG. 2, in the enumeration, first, the printer 11 receives a "USB BusReset" instruction from the host device 30 instructing the printer 11 to perform a reset process (BusReset) for the start of the enumeration. Next, the printer 11 receives "GetDescriptor" for requesting the configuration information which is referred to as a descriptor. The printer 11 transmits the configuration information to the host device 30 in response to the request. The configuration information contains class information of the USB device 11A, power mode information indicating bus power or self power, and requested power information indicating the value of the power requested of the host device 30. Here, when the power of the printer 11 is off, the class information is set to "human interface device (HID)", for example. When the power of the printer 11 is on, the class information is set to "printer class", for example.

In the present embodiment, the initialization process which requests bus power corresponds to an example of the first initialization process. The initialization process which requests self power corresponds to an example of the second initialization process. Note that, in the following description, there is a case in which the initialization process which requests the bus power is referred to as the first initialization process, and the initialization process which requests the self power is referred to as the second initialization process.

In the first initialization process which requests the bus power, the second power which is greater than the first power (the guaranteed power (for example, a current of 100 mA)) is set as the requested power information. The requested power information is indicated by requested current information which requests a current at a predetermined power voltage (for example, 5 volts). The requested current information which requests the second power is set to "500 mA", for example, which corresponds to the maximum power that it is possible to supply in the USB standard. Note that, the second power is not limited to the maximum power, may be a power with which it is possible to charge the secondary cell 14, and may be a power which is greater than the first power and less than the maximum power. The second power may be a power which is greater than the power "0 (zero)" which is supplied from the host device 30 after the completion of the second initialization process which requests self power, and is less than the maximum power.

The host device 30 recognizes that the USB device with which the USB connection is realized is a human interface device based on the class information (for example, the "HID class"). The host device 30 determines whether or not it is possible to supply power using the second power that is requested based on the requested current information (for example, 500 mA), and if it is possible to supply power using the second power, the host device 30 sets configuration information indicating this, and transmits "SetConfiguration", which is the initialization process completion notification (setting complete notification), to the printer 11.

As illustrated in FIG. 2, the printer 11 is in a non-chargeable state until the supply of power using the second power which is requested by the printer 11 in the enumeration is allowed and the printer 11 receives the initialization process completion notification "SetConfiguration". When the initialization process completion notification is received, power is supplied from the host device 30 to the printer 11 using the requested second power, and it becomes possible to charge the secondary cell 14.

In the present embodiment, when the printer 11 is in the power-off state and the connection partner is the host device 30 when the USB connection is detected in a state in which the AC adapter 50 is not connected, the CPU 24 inside the printer 11 is activated (charging activation on). At approximately the same time as the charging activation of the CPU 24, the CPU 24 causes the timer 24A to start measuring time. The CPU 24 measures the elapsed time from the point in time at which the CPU 24 is activated using the timer 24A, and determines whether or not the measured time T reaches the timeout time T1. If the printer 11 receives the initialization process completion notification "SetConfiguration" before the measured time T reaches the timeout time T1, since the supply of power using the second power (for example, a current of 500 mA) from the host device 30 starts, the secondary cell 14 is charged using the supplied second power.

Meanwhile, as illustrated in FIG. 3, when the configuration information that is transmitted by the printer 11 is not allowed by the host device 30 in the initialization process which is started once the USB connection between the printer 11 and the host device 30 is detected and the CPU 24 inside the printer 11 is activated (charging activation on), the printer 11 cannot receive the initialization process completion notification "SetConfiguration". In this case, in the printer 11, the measured time T of the timer 24A reaches the timeout time T1 without the printer 11 receiving the initialization process completion notification. When the measured time T reaches the timeout time T1 without the printer 11 receiving the initialization process completion notification "SetConfiguration" in this manner, the printer 11 turns off the charging activation (power off) by turning off the power of the CPU 24 which is turned on internally in order to perform charging.

Figure 4:
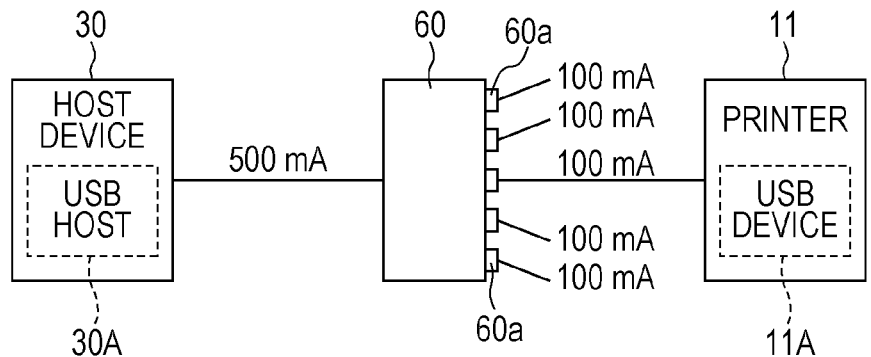
FIG. 4 is a schematic diagram illustrating an example in which a USB connection is realized between the host device and the printer via a hub.

Here, the case described hereinafter is given as an example in which the initialization process completion notification cannot be received even if the timeout time T1 passes. For example, as illustrated in FIG. 4, in a configuration in which the host device 30 and the printer 11 are connected via a hub 60 (a diverging device) which operates using bus power, when the number of ports 60a of the hub 60 is, for example, N ports (five ports in the example of FIG. 4), the supply of power can only be performed at a current (100 mA in the example of FIG. 4) of 500/N (mA) per port. Therefore, even if the printer 11 transmits configuration information containing the class information and the requested current information (for example, 500 mA), the host device 30 determines that it is not possible to perform the supply of power using the second power (for example, a current of 500 mA) based on the recognition that the connection is made via a hub. Therefore, since the host device 30 cannot allow the supply of power using the requested second power, the host device 30 does not set the configuration information. As a result, as illustrated in FIG. 3, the host device 30 does not transmit the initialization process completion notification "SetConfiguration" to the printer 11. Therefore, the printer 11 enters the standby state in which the printer 11 waits to receive the initialization process completion notification "SetConfiguration" that will not be transmitted from the host device 30.

There is a case in which the supply of power to the USB device (the printer 11) when the host device 30 is battery driven is set to be restricted to a predetermined power which is less than the maximum power (for example, the maximum power is a current of 500 mA) or less. In the host device 30 in this case, since the host device 30 cannot perform the supply of power using the second power that is requested by the printer 11, the initialization process completion notification "SetConfiguration" is not transmitted from the host device 30 to the printer 11. Even in this case, the printer 11 enters the standby state in which the printer 11 waits to receive the initialization process completion notification "SetConfiguration" which will not be transmitted from the host device 30.

In the standby state, since the CPU 24 waits in the active state (the charging activation on state), the CPU 24 consumes the power of the secondary cell 14. In the standby state, while the printer 11 receives the supply of power from the host device 30 through the USB cable 35 using the first power (for example, a current of 100 mA), since the power that is consumed by the active CPU 24 in the initialization process is greater than the first power, the remaining capacity of the secondary cell 14 is slowly depleted with the passage of the standby time.

Therefore, in the present embodiment, when the timeout time T1 described earlier is set, the measured time T reaches the timeout time T1 and the process times out without the CPU 24 receiving the initialization process completion notification, the CPU 24 assumes that the request contained in the configuration information that is transmitted to the host device 30 as a response is not allowed and that the initialization process has failed, and turns off the power (charging activation off). Since the timeout time T1 is set to a value corresponding to the longest BIOS necessary activation time of the plural types of host device 30 which are anticipated to be connected to the USB connector 12, the process times out after waiting a substantially sufficient time for the BIOS activation of the host device 30. Therefore, the timeout time T1 is set to a value at which it is easy to avoid the inconvenience of the process timing out as a result of a timeout time which is too short, even though it would have been possible to perform the charging if the CPU 24 had waited, and it becoming impossible to charge the secondary cell 14.

The timeout time T1 may be the same when the power is on as when the power is off. However, in the present embodiment, the timeout time T1 is set to different values when the power is on and when the power is off. In particular, in the present embodiment, a timeout time T12 when the power is on is set to be shorter than a timeout time T11 when the power is off (T11>T12). These settings are adopted for the following reasons. Since the user does not instruct the printer 11 to perform a process (for example, the printing process) from the host device 30 when the power is off, no problems arise even if the timeout time T11 when the power is off is set to a value that is slightly long, corresponding to the necessary activation time of the host device 30. However, when the timeout time T12 when the power is on is long, this causes a delay in the starting of the process which the user instructs the printer 11 to perform from the host device 30. Therefore, the timeout time T11 is set to a relatively long value in order to increase the frequency of the charging while the power is off, and while the power is on, the user sets the timeout time T12 to a relatively short value in order to suppress the occurrence of waiting time for the process which the user instructs the printer 11 to perform from the host device 30 to a short time. Note that, the timeout time may be set to satisfy T11<T12.

Figure 5:
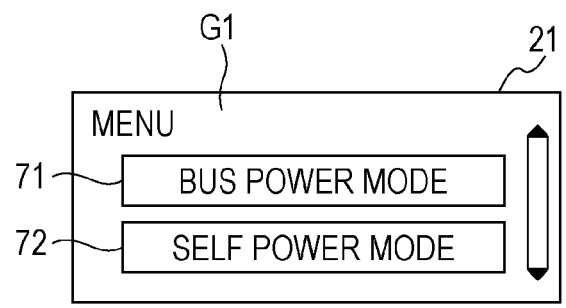
FIG. 5 is a schematic diagram illustrating a display unit on which a mode setting screen is displayed.

When a user operates the operation switches 20B to proceed to the lower levels of the menu on the display unit 21, as illustrated in FIG. 5, a mode setting screen G1 is displayed. The mode setting screen G1 is provided with a first button 71 and a second button 72. According to the operation of the operation switches 20B, the first button 71 is selected when setting the bus power mode, and the second button 72 is selected when setting the self power mode. The bus power mode is set by the user operating the operation switches 20B to select the first button 71, and the self power mode is set by selecting the second button 72. The power mode which is set by the user is written to a predetermined storage region (refer to FIG. 6A) of the non-volatile memory 25 by the CPU 24.

Figure 6A:
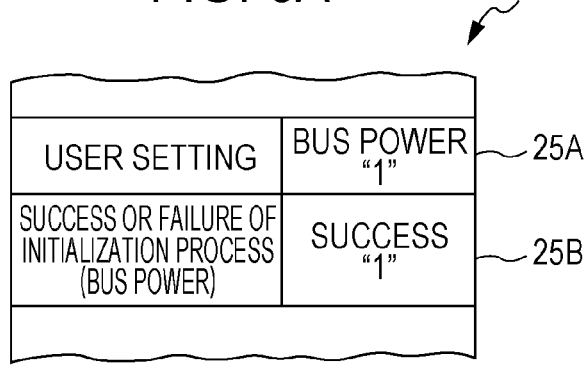
FIGS. 6A and 6B is a schematic diagram illustrating setting information which is stored in non-volatile memory.
Figure 6B:
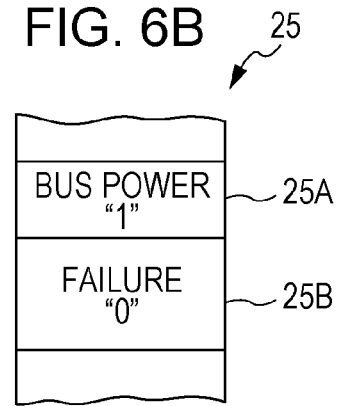

As illustrated in FIGS. 6A and 6B, when the "bus power mode" is selected and set by the operation of the operation switches 20B, a value ("1" for example) indicating bus power is stored in a first storage region 25A of the non-volatile memory 25. Meanwhile, when the "self power mode" is selected and set by the operation of the operation switches 20B, a value ("0" for example) indicating self power is stored in the first storage region 25A of the non-volatile memory 25. In this manner, the user can select between bus power and self power. USB communication setting content (user setting content) which the user sets by operating the operation switches 20B is stored in the first storage region 25A of the non-volatile memory 25.

Here, the term "bus power" indicates a power supply mode in which a supply of power is received from the host device 30 through a bus line of the USB cable 35 when the printer 11 is connected to the host device 30 through the USB cable 35. Meanwhile, the term "self power" indicates a non-receiving power mode in which the electronic device (the printer 11 in the present example) does not receive a supply of power from the host device 30 and covers the power itself when the printer 11 is connected to the host device 30 through the USB cable 35.

A second storage region is prepared in the non-volatile memory 25. The second storage region stores whether the initialization process (the first initialization process) containing the request for bus power is successful or a failure, separately from the user setting content. In the present embodiment, the initial setting is bus power, the setting of bus power is maintained if the initialization process which is executed in order to establish USB communication with the host device is successful, and when the initialization process fails, the setting is switched to self power. Therefore, as illustrated in FIGS. 6A and 6B, information relating to the success or failure of the previous initialization process which requests bus power is stored in a second storage region 25B of the non-volatile memory 25. In other words, when the initialization process which requests bus power is successful, as illustrated in FIG. 6A, a value (for example "1") indicating success is written to the second storage region 25B, and when the initialization process fails, as illustrated in FIG. 6B, a value (for example "0") indicating failure is stored in the second storage region 25B.

If the previous initialization process (the first initialization process) which requests bus power is successful based on the value that is stored in the second storage region 25B, the CPU 24 also requests bus power this time and executes the first initialization process. Meanwhile, if the previous initialization process fails, the CPU 24 executes the initialization process (the second initialization process) which requests self power this time. When it is detected that the USB cable 35 is pulled out from the USB connector 12, the CPU 24 rewrites the setting content of the second storage region 25B with the value of the time of the initial setting indicating bus power. This is because, since the partner host device 30 is the same while the connection of the USB cable 35 is maintained, for the host device 30 that has been successful once, performing the initialization process which requests bus power should also succeed this time with a high probability, and for the host device that has failed once, performing the initialization process which requests bus power should also fail this time with a high probability. For the reason described above, while the USB connection with the host device 30 is maintained, the CPU 24 confirms whether the previous time was a success or a failure in the non-volatile memory 25 at the timing at which the next initialization process is performed, and sets the requested power mode during the current initialization process to bus power if the previous time was a success, and to self power if the previous time was a failure. Note that, the values to be stored in the second storage region 25B of the non-volatile memory 25 are "1" and "0". Here, to facilitate explanation, "1" and "0" are depicted as values indicating a success or a failure; however, the values have the same meaning even if the values indicate bus power or self power.

Figure 7:
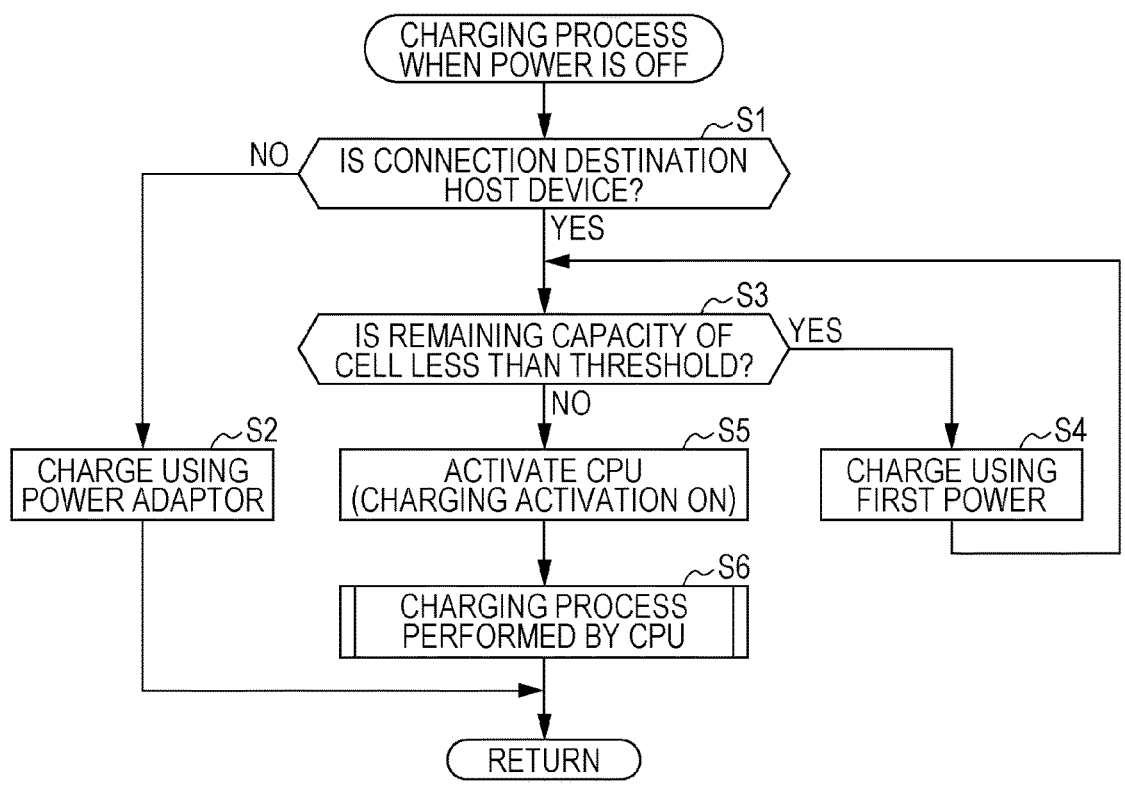
FIG. 7 is a flowchart illustrating a main routine of a charging process when power is off.
Figure 8:
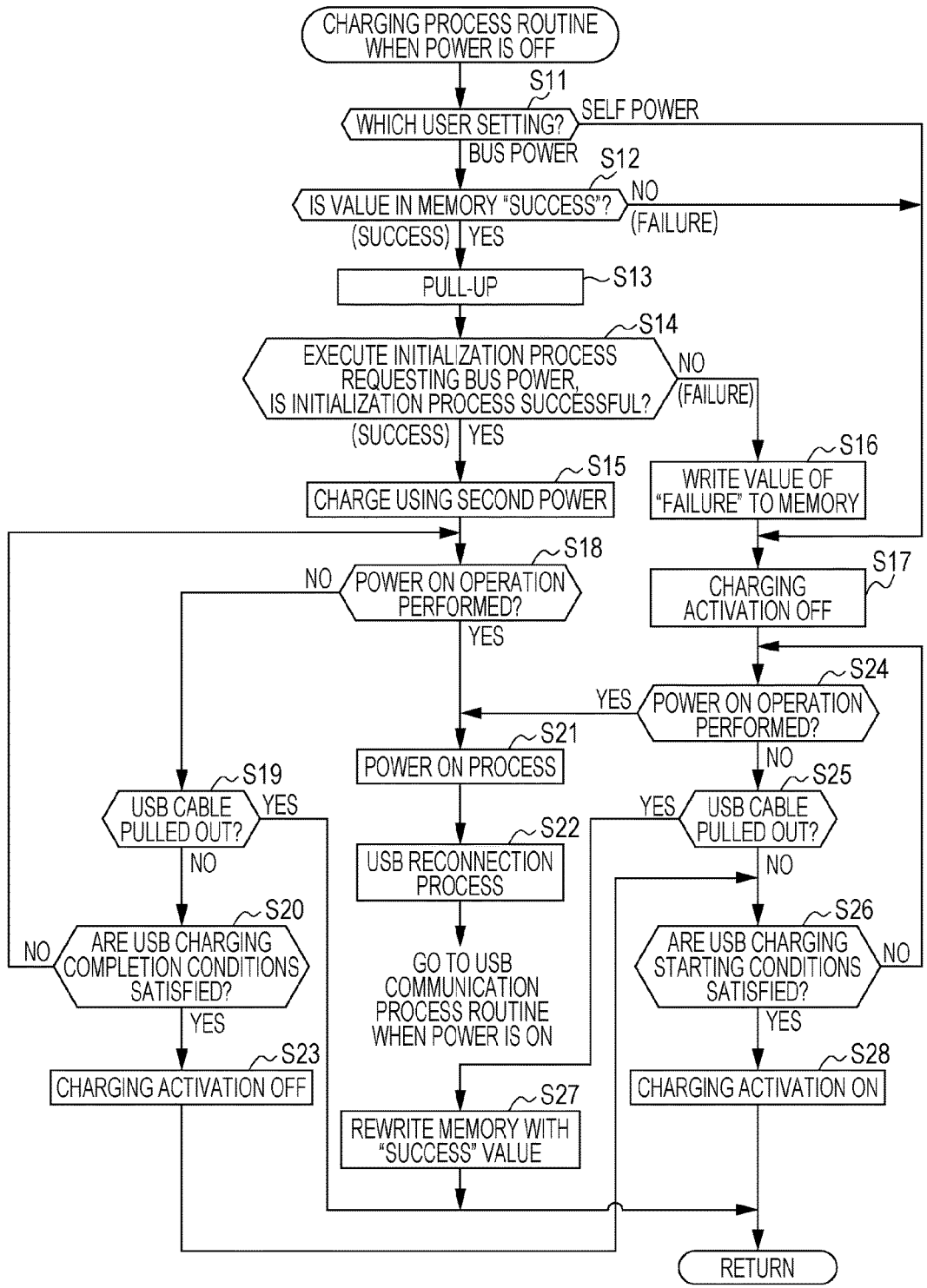
FIG. 8 is a flowchart illustrating a charging process routine.
Figure 9:
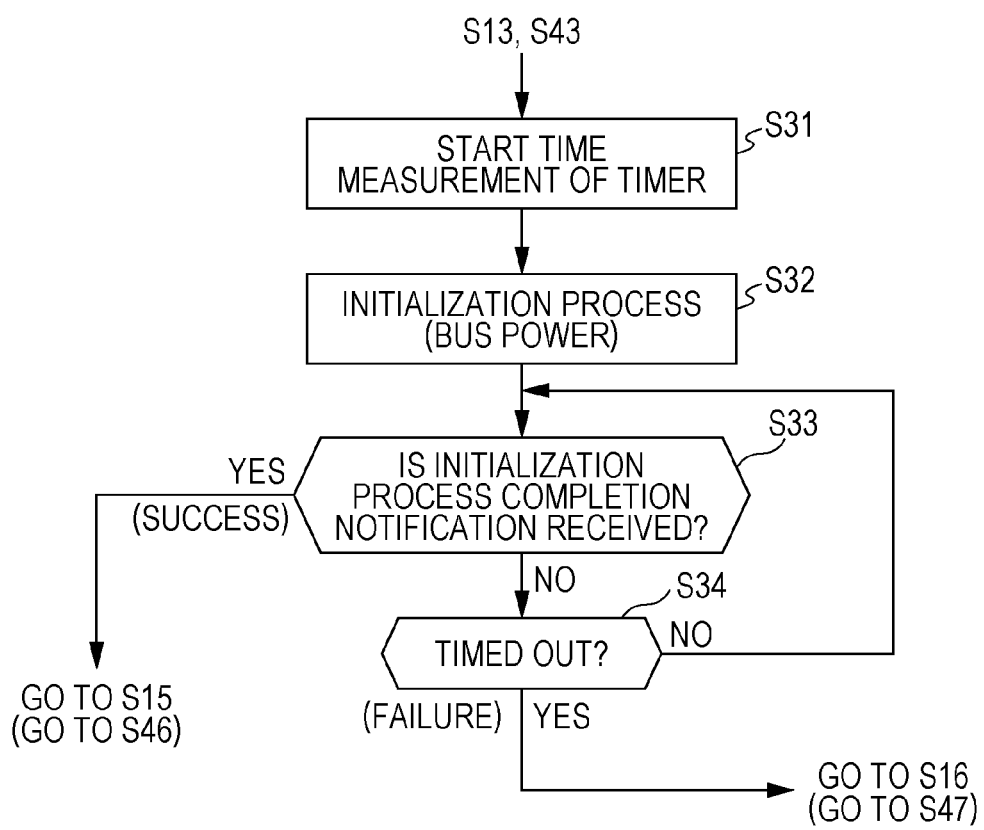
FIG. 9 is a flowchart illustrating the initialization process when bus power is requested.
Figure 10:
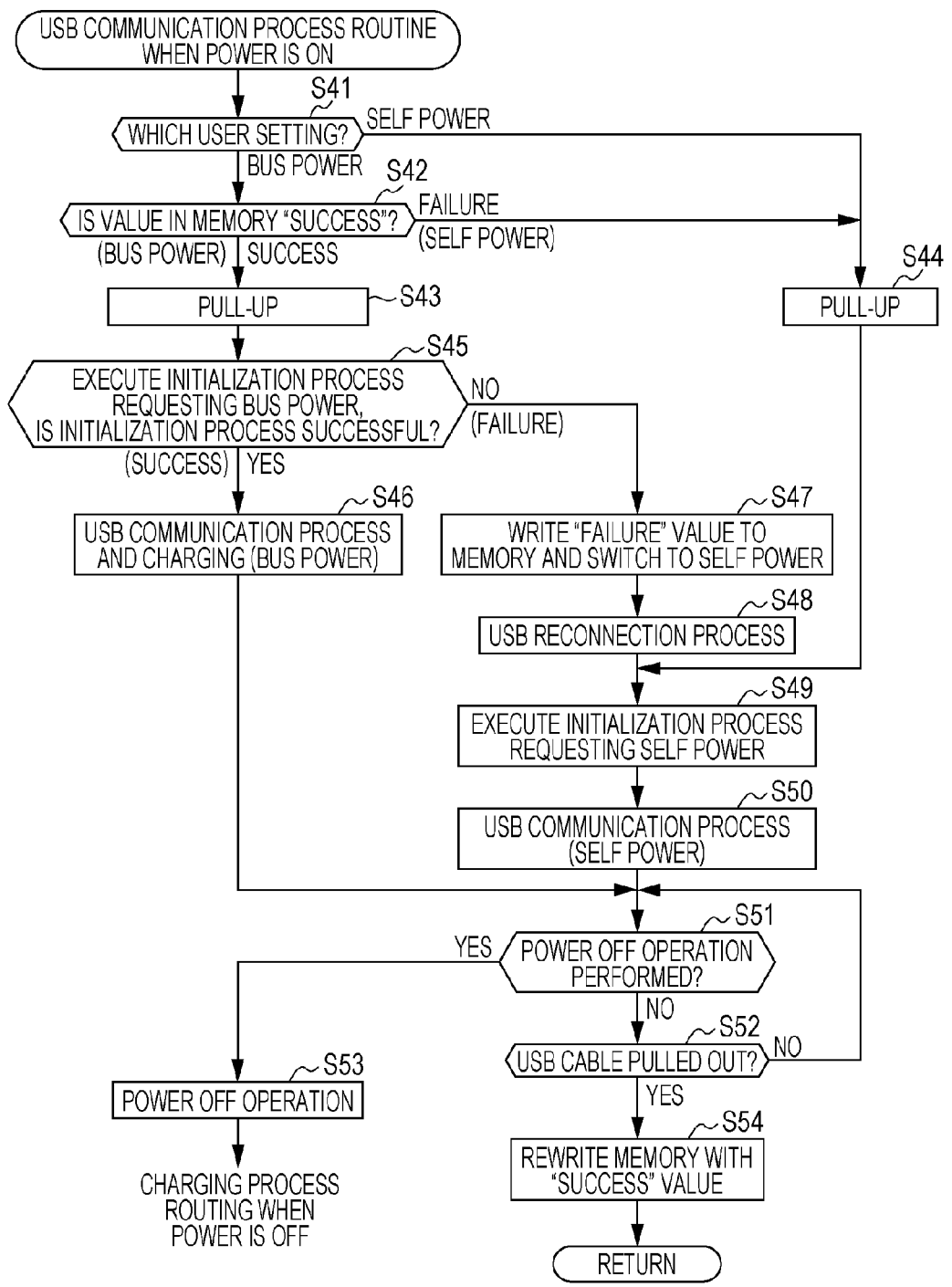

A program for the charging process when the power is off illustrated in the flowcharts in FIGS. 7 to 9, and a program for the USB communication process when the power is on illustrated in FIG. 10 are stored in the non-volatile memory 25 of the printer 11. Note that, the programs include a portion which is not written to the control IC 22 (steps S1 to S5), and a portion which is stored in the non-volatile memory 25 and executed by the CPU 24 (step S6).

Next, description will be given of the operations of the printer 11 with reference to FIGS. 7 to 10. In other words, description will be given of the charging process (FIGS. 7 to 9) which is executed by the control IC 22 and the CPU 24 inside the printer 11 when the power is off, and the USB communication process (FIGS. 9 and 10) which is executed by the CPU 24 inside the printer 11 when the power is on. The charging process which is illustrated in FIGS. 7 to 9 is performed in a state in which the printer 11 is in the power-off state, and the charging to the secondary cell 14 by the AC adapter 50 is not being performed by the AC adapter 50, which is not connected.

Note that, as illustrated in FIG. 6A, "bus power" (for example, a value of "1") is set in the first storage region 25A in the non-volatile memory 25 (hereinafter, also simply referred to as the "memory 25"), and "success (bus power)" (for example, a value of "1") is set in the second storage region 25B. In other words, the setting values of the first storage region 25A and the second storage region 25B are respectively the same values as at the time of the initial setting. In this manner, bus power is set as the user setting, and a value indicating success is set as the initialization process success or failure information.

When some sort of connector is connected to the USB connector 12 and a USB connection is detected, the control IC 22 is activated, and the charging process illustrated in FIG. 7 is started.

In step S1, it is determined whether or not the connection destination is a host device. In other words, the control IC 22 determines whether the connection destination is the host device 30 which functions as the USB host 30A, or a power adapter such as the USB battery charger 40. For example, when the data lines are (D+)≠(D−), the connection destination is determined to be the host device 30, and when the data lines are (D+)=(D−), the connection destination is determined to be the power adapter. If the connection destination is the power adapter instead of the host device 30, the process proceeds to step S2, and if the connection destination is the host device 30, the process proceeds to step S3.

In step S2, charging is started using the power adapter. In the case of the present example, the secondary cell 14 is charged using the power from the USB battery charger 40.

In step S3, it is determined whether or not the remaining capacity of the secondary cell is less than a threshold. In other words, it is determined whether or not the remaining capacity of the secondary cell 14 is less than a threshold which is a sufficient remaining capacity to perform the initialization process. If the remaining capacity of the secondary cell 14 is less than the threshold, the process proceeds to step S4, and if the remaining capacity is not less than the threshold, the process proceeds to step S5.

In step S4, the secondary cell is charged using the first power (for example, 100 mA). The charging using the first power is performed until the remaining capacity of the secondary cell 14 reaches the threshold. When the secondary cell 14 is charged until the remaining capacity thereof is the threshold or greater (false determination in step S3), the process proceeds to step S5.

In step S5, the CPU is activated (charging activation on). In other words, the control IC 22 activates the CPU 24 by switching the third switch 28 from off to on. In this manner, the CPU 24 is activated in order to cause the CPU 24 to perform the initialization process with the host device 30 which is necessary before starting the charging of the secondary cell 14.

In step S6, the charging process is performed by the CPU. The charging process is performed by the CPU 24 executing the charging process routine illustrated in FIG. 8 when the power is off. Hereinafter, description will be given of the charging process routine performed by the CPU 24, with reference to FIG. 8.

In step S11, the user setting which relates to the power mode is determined. In other words, it is determined whether the user setting is bus power or self power. In the present example, the user setting is set to bus power in the initial setting, and is set to self power when the user selects self power by operating the operation switches 20B. The CPU 24 determines whether the power mode is bus power or self power based on the value that is stored in the first storage region 25A of the memory 25.

Here, one object of the user setting self power is to ensure that the initialization process fails extremely rarely, since the initialization process is performed using self power, even when the host device 30 is connected to the printer 11 via the hub 60 and the supply of power cannot be performed using the second power (for example, a current of 500 mA). For example, if the initialization process is performed when the power is on, the USB communication is reliably established thereafter, and the printer 11 can perform printing based on the print data from the host device 30. However, in the present embodiment, control is adopted in which, even if the initialization process which requests bus power fails due to being connected via the hub 60 or the like, the failure is detected, and the power mode is switched from bus power to self power. An object of the user setting self power is to ensure that the power of the battery of a laptop computer or the like is not used for the printer 11 and lasts a long time when the host device 30 is a laptop computer or the like and operated using the power of a battery. The process proceeds to step S12 when the user setting is bus power, and to step S17 when the user setting is self power. Since charging is not performed in the case of self power, in step S17, the charging activation is turned off (charging activation off) by turning off the activation of the control IC 22 and the CPU 24.

In step S12, it is determined whether or not the value in the memory 25 (the second storage region 25B) is success. If the value in the memory 25 indicates "success" (for example, "1"), the process proceeds to step S13, and if the value in the memory 25 does not indicate success (that is, is a value indicating a failure (for example, "0")), the process proceeds to step S17. Since charging is not performed in the case of self power, in step S17, the charging activation is turned off (charging activation off) by turning off the activation of the control IC 22 and the CPU 24.

In step S13, a pull-up is performed. In other words, the CPU 24 performs a pull-up by changing the voltage of the data lines D+ and D−. The host device 30 detects the connection of the USB device 11A (the printer 11) using the pull-up, and the initialization process (the enumeration) is started (refer to FIGS. 2 and 3).

In step S14, the initialization process (the first initialization process) which requests bus power is executed, and it is determined whether or not the initialization process is successful. The process of step S14 is performed by the CPU 24 executing the initialization process routine illustrated in the flowchart in FIG. 9, and the specifics thereof are performed as described hereinafter.

First, in step S31 of FIG. 9, the timer starts measuring the time. In other words, the CPU 24 causes the timer 24A to start measuring time. As a result, the timer 24A measures the elapsed time (the measured time T) from an activation time of the CPU 24 (the pull-up time, to be exact). Note that, the order of the time measurement starting process (step S31) performed by the timer 24A and the pull-up process (step S13) may be reversed.

In step S32, the initialization process (the first initialization process) which requests bus power is performed. Configuration information referred to as a descriptor is transmitted in response to the request from the host device 30. The configuration information includes the class information indicating the class of the USB device, power mode information which is transmitted to the USB host as a request (requested power mode information), and information of the power to be requested of the USB host (requested power information). One of the printer class and the human interface device (HID) class is used for the class information. Since the printing is not performed while the power is off, the HID class is used. In the charging mode in the power-off state, the printer 11 of the present example requests "bus power" and requests the second power (for example, a current of 500 mA) as the supplied power. Therefore, the printer 11 specifies the HID class, and transmits a response with the configuration information which requests the second power using bus power to the host device 30. Note that, in the initialization process which is performed while the power is on, the printer class is used as the class information in the configuration information, and the host device 30 recognizes the USB device 11A as a printer. Another class such as the mass storage class may be used instead of the HID class.

The initialization process which requests bus power is performed as illustrated in FIG. 2. When the USB connection is detected due to the pull-up, the enumeration between the host device 30 and the printer 11 is started as the initialization process. A "USB BusReset" which instructs a bus reset is transmitted from the host device 30 to the printer 11, and the printer 11 which receives the instruction performs a bus reset. Next, a "GetDescriptor" which requests the configuration information (the descriptor) is transmitted from the host device 30 to the printer 11. The printer 11 which receives the "GetDescriptor" transmits the configuration information containing the class information (for example, "HID"), the power mode information ("bus power"), and the requested power information ("the second power (for example, 500 mA)").

The host device 30 determines whether or not to allow the USB communication connection under the requested conditions based on the configuration information which is received from the printer 11. If the host device 30 determines that the supply of power at bus power and the second power is possible, the host device 30 sets the device configuration and the like by writing the configuration information of the printer 11 to the memory, and as illustrated in FIG. 2, transmits the initialization process completion notification "SetConfiguration" indicating that the initialization process is completed to the printer 11.

Meanwhile, as illustrated in FIG. 4, when the host device 30 is connected to the printer 11 via a bus power hub, even if the printer 11 transmits the configuration information containing bus power and the second power, the host device 30 recognizes that the connection is established via a hub, and therefore determines that it is not possible to supply the power using the requested second power, and does not allow the establishment of USB communication. In this case, as illustrated in FIG. 3, the initialization process completion notification "SetConfiguration" is not transmitted from the host device 30 to the printer 11. Accordingly, the CPU 24 inside the printer 11 waits in the active state for the initialization process completion notification "SetConfiguration" which will not be transmitted from the host device 30. While waiting, the active (charging activation on state) CPU 24 wastes power, and the remaining capacity of the secondary cell 14 is depleted.

When the supply of power to the USB device 11A when the host device 30 is battery driven is set to be restricted to a predetermined power which is less than the maximum power (a current of 500 mA) or less, it is not possible to perform the supply of power using the second power (a current of 500 mA) which is requested by the printer 11. Therefore, the initialization process completion notification "SetConfiguration" is not transmitted from the host device 30 to the printer 11. Even in this case, the CPU 24 inside the printer 11 waits in the active state for the initialization process completion notification "SetConfiguration" which will not be transmitted from the host device 30. While waiting, the power of the secondary cell 14 is wasted by the active CPU 24. In these cases, although the first power (a current of 100 mA) is supplied from the host device 30 via the USB cable 35, when the power which is consumed by the active CPU 24 in the initialization process surpasses the first power, the remaining capacity of the secondary cell 14 is gradually depleted.

In step S33, it is determined whether or not the initialization process completion notification is received. If the CPU 24 does not receive the initialization process completion notification, the process proceeds to step S34, and if the CPU 24 receives the initialization process completion notification and the initialization process is successful, the process proceeds to step S15 (FIG. 8).

In step S34, it is determined whether or not the process has timed out. In other words, it is determined whether or not the measured time T of the timer 24A reaches the timeout time T1. If the process has not timed out, the process returns to step S33. In this manner, the processes of steps S33 and S34 are repeatedly executed until the initialization process completion notification is received (an affirmative determination in step S33), or the process times out (an affirmative determination in step S34). When the process times out and the initialization process fails, the process proceeds to step S16 (FIG. 8).

Returning to FIG. 8, in the process of step S14 (FIG. 9), the process proceeds to step S15 when the initialization process completion notification is received and the initialization process is successful. Conversely, process proceeds to step S16 when the process times out before the initialization process completion notification is received and the initialization process is a failure.

In step S15, the secondary cell is charged using the second power (for example, a 500 mA current). In other words, the secondary cell 14 is charged using the second power which is the power supplied from the host device 30. On the other hand, if the initialization process is a failure, in step S16, a value indicating failure is written to the memory. The CPU 24 writes a value (for example, "0") indicating failure, as illustrated in FIG. 6B, for example, to the second storage region 25B of the memory 25. Note that, when the initialization process is successful in step S14, since a value (the initial value (for example, "1")) indicating success during the initial setting is stored in the second storage region 25B of the memory 25 as the initialization process success or failure information, in particular, re-writing is not performed. Naturally, a value indicating success may be written to the memory 25.

In the next step S17, the charging activation is turned off (charging activation off) by turning off the CPU 24 and the control IC 22. Specifically, when the measured time T, which is the elapsed time from the activation time of the CPU, reaches the timeout time T1 without receiving the initialization process completion notification, the power of the CPU 24 and the control IC 22 in the active state is turned off together, and the charging of the secondary cell 14 is stopped before starting the charging. A charging activation off process is performed by, for example, the control IC 22 turning off the power of the CPU 24 by turning off the third switch 28 according to an off instruction from the CPU 24, and subsequently turning off the power of the control IC 22 itself. In this manner, it is possible to suppress the wasting of power and the depletion of the remaining capacity of the secondary cell 14 caused by the CPU 24 continually waiting for the initialization process completion notification that will not be transmitted due to the failure of the initialization process.

When the initialization process is successful using the bus power request, the charging of the secondary cell 14 is performed, and when the initialization process fails, the fact that the initialization process has failed is stored in the memory 25, and the power of the control IC 22 and the CPU 24, the activation of which is triggered by the USB connection detection, is turned off.

During the charging or while the power is off, the CPU 24 performs the next processes. In other words, during the charging, in step S18, the determination of whether or not the power on operation is performed, in step S19, the determination of whether or not the USB cable is pulled out, and in step S20, the determination of whether or not the USB charging completion conditions are satisfied are repeatedly executed until an affirmative determination is obtained in one of the determination processes. For example, if the power on operation is performed in step S18, the process proceeds to step S21, and the power on process is performed. In other words, the second switch 27 is turned on by the operation of the power switch 20A only while the operation is being performed, the CPU 24 is activated by power being supplied from the power circuit 23 to the CPU 24, and the third switch 28 is connected by the CPU 24 instructing the control IC 22. Therefore, even if a hand is removed after pressing the power switch 20A, the supply of power to the CPU 24 is maintained. Note that, the power on process in the present embodiment includes a process of temporarily turning off the charging activation in which only a portion of the printer 11 is active, and subsequently switching on the power of the entire printer 11. This process is performed because, since performing the process of activating only the remaining other portion when only a portion of the printer 11 is active requires the monitoring of which portion is active and requires the performing of onerous controlling in which the other inactive portion is selected and activated, the load of monitoring and the load of controlling may be reduced by turning off the power of the portion which is temporarily active and then turning on the power of the entire printer 11 again.

In the next step S22, the USB reconnection process is performed. In other words, the pull-up state is temporarily released. The process transitions to the USB communication process routine (FIG. 10) when the power is on. Accordingly, when a pull-up is performed in step S43 or step S44 (described later) in the USB communication process routine when the power is on with the USB cable 35 still connected, the USB host 30A of the host device 30 detects a reconnection (a USB connection) with the USB device 11A. Therefore, it is possible to perform the initialization process (step S45 or step S49) between the host device 30 and the printer 11 by performing the reconnection.

In step S19, when the USB cable is pulled out (an affirmative determination), the routine ends. At this time, the charging to the secondary cell 14 is stopped by the USB cable 35 being pulled out.

In step S20, when the USB charging completion conditions are satisfied, the process proceeds to step S23, and the charging activation is turned off by turning off the power of the CPU 24 and the control IC 22. Here, the term "USB charging completion conditions" indicates the conditions under which the charging of the secondary cell 14 is ended while the USB connection to the host device 30 through the USB cable 35 is maintained, and examples of these conditions include (1) the secondary cell 14 is fully charged, and (2) a power adapter such as the AC adapter 50 which is prioritized over the host device 30 as the power for charging is connected. Here, when the control IC 22 monitors the remaining capacity of the secondary cell 14 while the secondary cell 14 is charging and the secondary cell 14 is fully charged, the charging of the secondary cell 14 is ended by turning off the first switch 26. Notification indicating that the secondary cell 14 is fully charged is transmitted from the control IC 22 to the CPU 24. When one of the two conditions is satisfied, the USB charging to the secondary cell 14 is stopped, and the charging activation is turned off. For example, when the AC adapter 50 is connected, the control IC 22 which detects the connection stops the activation of the CPU 24. The power is switched from the host device 30 via USB to the AC adapter 50, and from that point onward, the charging to the secondary cell 14 is performed using the power which is supplied via the AC adapter 50. After the charging activation turns off, the process proceeds to step S26, which is one of the processes performed while the charging activation is off.

Meanwhile, after the charging activation is turned off (step S17), in step S24, the determination of whether or not the power on operation is performed, in step S25, the determination of whether or not the USB cable is pulled out, and in step S26, the determination of whether or not the USB charging starting conditions are satisfied are repeatedly executed until an affirmative determination is obtained in one of the determination processes. For example, if the power on operation is performed in step S24, the process proceeds to step S21, the same power on process is performed as when the power on operation is performed while charging. Furthermore, in step S22, the USB reconnection process is performed, and the process subsequently transitions to the USB communication process routine when the power is on.

In step S25, when the USB cable is pulled out (an affirmative determination), the process proceeds to step S27, the memory 25 is rewritten with a value indicating success, and the routine subsequently ends. Here, the reason that the memory 25 is rewritten with the value indicating success is that, since there is a likelihood that the next host device 30 to be connected by USB will change due to the USB cable 35 being pulled out, it is possible to attempt the initialization process using bus power since there is a high likelihood that the initialization process will succeed if the host device 30 is changed.

In step S26, when the USB charging starting conditions are satisfied, the process proceeds to step S28, and the charging activation is turned on by turning on the power of the CPU 24 and the control IC 22. Here, the term "USB charging starting conditions" indicates the conditions under which the charging of the secondary cell 14 is started in the charging activation off state while the USB connection with the host device 30 through the USB cable 35 is maintained. Examples of the USB charging starting conditions include (3) the remaining capacity of the secondary cell 14 falls below a threshold (for example, a predetermined value (%) within a range from 90% to 99% of fully charged) which is set to a value which is lower than fully charged by a predetermined level, and (4) the connection of a power adapter such as the AC adapter 50 which is prioritized over the host device 30 as the power for charging is removed. When one of these two conditions is satisfied, the process proceeds to step S28.

In step S28, the charging activation is turned on (charging activation on) by activating the control IC 22 and the CPU 24. After the charging activation is turned on, the process returns to step S11. In other words, by setting the CPU 24 to the active state before the routine ends, the CPU 24 can start the routine again based on the charging starting conditions being satisfied. In this manner, the printer 11 is reconnected to the host device 30 by the USB charging starting conditions being satisfied, the charging activation being performed (steps S26 and S28), and the pull-up being performed in the next step S13 in a state in which the connection with the host device 30 is continued without the USB cable 35 being pulled out after the USB charging completion conditions are satisfied (an affirmative determination in step S20).

For example, when the charging process routine described above is ended in a state in which a value indicating failure is written to the memory 25 while the USB connection with the host device 30 through the USB cable 35 is maintained, the next process is performed. In other words, since the value of the memory in step S12 is failure, the charging activation is turned off (step S17) without the process proceeding to the initialization process (step S14).

In other words, when the USB cable 35 is not pulled out, the connection partner of the USB connection is the same as the host device 30 when performing the previous initialization process. Therefore, since if the previous time was a failure, the current time will also fail, if the value held in the memory indicates that the previous initialization process failed, the charging activation is turned off without performing the first initialization process which requests bus power. Therefore, it is possible to suppress the wasting of power and the depletion of the remaining capacity of the secondary cell 14 which accompany the wasteful execution of the initialization process.

Meanwhile, there is a likelihood that when the USB cable 35 is pulled out, the connection partner when the next USB connection is detected is a different host device 30 from when the USB cable 35 is pulled out. Even if the initialization process fails with the previous host device 30, when the USB cable 35 was previously pulled out, the value in the memory 25 (the second storage region 25B) is rewritten from "failure" to "success" (step S27). Therefore, subsequently, since the value indicates success in step S12 after restarting the routine, it is possible to execute the first initialization process which requests bus power in step S14 which the process proceeds to after performing the pull-up (step S13). Therefore, if the connection partner is a different host device 30 from the previous time, bus power is used, and the second power is allowed, it is possible to charge the secondary cell 14 using the second power (a current of 500 mA) which is supplied using bus power.

When the power on operation is performed in a state in which the host device 30 when the initialization process fails is connected through the USB cable 35 and the printer 11 is activated, the value in the memory 25 (the second storage region 25B) remains the value indicating "failure". When the power on operation is performed in a state in which the host device 30 when the initialization process succeeds is connected through the USB cable 35 and the printer 11 is activated, the value in the memory 25 (the second storage region 25B) becomes the value indicating "success".

Next, description will be given of the USB communication process routine when the power is on, with reference to FIG. 10. When the user operates the power switch 20A to turn on the power of the printer 11 which is connected to the host device 30 via the USB cable 35, the CPU 24 executes the USB communication process routine illustrated in FIG. 10. When the USB connection is not established in a state in which the power of the printer 11 is on, even when the USB is connected, the CPU 24 executes the USB communication process routine illustrated in FIG. 10. When the printer 11 is in the power-on state, when the user instructs the printer 11 to print by operating an input device (not shown) of the host device 30, the print data is transmitted from the host device 30 to the printer 11 through the USB cable 35. However, in order to cause the printer 11 to print using an instruction from the host device 30, it is necessary for the initialization process to be successful and for USB communication to be established between both the host device 30 and the printer 11.

Steps S41 to S43 are the same processes as those of steps S11 to S13 in FIG. 8. In other words, in step S41, it is determined whether the user setting is bus power or self power. Specifically, the CPU 24 determines whether the power mode that is set by the user is bus power or self power based on the value that is stored in the first storage region 25A of the memory 25. The process proceeds to step S42 when the user setting is bus power, and to step S44 when the user setting is self power.

Here, one object of the user setting self power is to establish the USB communication when the power is on and to ensure that it is possible to perform the printing based on the print data from the host device 30 by performing the initialization process using self power even when the host device 30 is connected to the printer 11 via the hub 60 and the supply of power cannot be performed using the second power (for example, a current of 500 mA). However, in the present embodiment, even if the user setting is bus power, the controlling in which the failure of the initialization process is detected and the power mode is switched from bus power to self power is adopted.

In step S42, the value in the memory 25 (the second storage region 25B) determines whether or not the process is successful. If the value in the memory 25 indicates "success" (for example, "1"), the process proceeds to step S43, and if the value in the memory 25 does not indicate success (that is, is a value indicating a failure (for example, "0")), the process proceeds to step S44.

In step S43, a pull-up is performed. In other words, the CPU 24 performs a pull-up by changing the voltage of the data lines D+ and D−. The host device 30 detects the connection of the USB device 11A (the printer 11) using the pull-up, and the initialization process (the enumeration) is started (refer to FIGS. 2 and 3).

In the next step S45, the initialization process (the first initialization process) which requests bus power is executed, and it is determined whether or not the initialization process is successful. The process of step S45 is performed by the CPU 24 executing the initialization process routine illustrated in the flowchart in FIG. 9, and the specifics thereof are performed as described hereinafter.

First, in step S31 of FIG. 9, the timer starts measuring the time. In other words, the CPU 24 causes the timer 24A to start measuring time. As a result, the timer 24A measures the elapsed time (the measured time T) from an activation time of the CPU 24 (the pull-up time, to be exact). Note that, the order of the time measurement starting process (step S31) performed by the timer 24A and the pull-up process (step S13) may be reversed.

In step S32, the initialization process (the first initialization process) which requests bus power is performed. Here, the CPU 24 transmits the configuration information referred to as the descriptor in response to the request from the host device 30. At this time, since the premise is that the printing is performed while the power of the printer 11 is on, the printer class is used. The CPU 24 specifies the printer class, and transmits a response with the configuration information which requests the second power (for example, a current of 500 mA) using bus power to the host device 30. Since the class information in the configuration information is the printer class, the host device 30 recognizes the USB device 11A as a printer. Therefore, if the host device 30 receives a print request, the host device 30 transmits the print data to the printer 11 through USB communication.

The first initialization process is performed as illustrated in FIG. 2 in the same manner when the power is on and when the power is off. When the USB connection is detected due to the pull-up, the enumeration between the host device 30 and the printer 11 is started as the initialization process. When the printer 11 receives the "GetDescriptor" from the host device 30, the printer 11 transmits the configuration information (the descriptor) containing the class information (for example, "printer"), the power mode information ("bus power"), and the requested power information ("the second power (for example, 500 mA)").

The host device 30 determines whether or not to allow the USB communication connection under the requested conditions based on the configuration information which is received from the printer 11. If the host device 30 determines that the supply of power using bus power and the second power is possible, the host device 30 sets the device configuration and the like by writing the configuration information of the printer 11 to the memory, and as illustrated in FIG. 2, transmits the initialization process completion notification "SetConfiguration" to the printer 11.

Meanwhile, as illustrated in FIG. 4, when the host device 30 is connected to the printer 11 via a bus power hub, even if the printer 11 transmits the configuration information containing bus power and the second power, the host device 30 recognizes that the connection is established via a hub, and therefore determines that it is not possible to supply the power using the requested second power, and does not allow the establishment of USB communication. In this case, as illustrated in FIG. 3, the initialization process completion notification "SetConfiguration" is not transmitted from the host device 30 to the printer 11. Accordingly, the printer 11 waits in the active state for the initialization process completion notification "SetConfiguration" which will not be transmitted from the host device 30. While waiting, the power is wasted by the active CPU 24.

When the supply of power to the USB device 11A when the host device 30 is battery driven is restricted, it is not possible to allow the supply of the second power (a current of 500 mA) which is requested by the printer 11. Even in this case, the CPU 24 inside the printer 11 waits in the active state for the initialization process completion notification "SetConfiguration" which will not be transmitted from the host device 30, and consumes power. In these cases, although the first power (a current of 100 mA) is supplied from the host device 30 through the USB cable 35 while waiting until the initialization process completion notification is transmitted, when the power which is consumed by the active CPU 24 in the initialization process surpasses the first power, the remaining capacity of the secondary cell 14 is gradually depleted.

In step S33, it is determined whether or not the initialization process completion notification is received. If the CPU 24 does not receive the initialization process completion notification, the process proceeds to step S34, and if the CPU 24 receives the initialization process completion notification and the initialization process is successful, the process proceeds to step S46 (FIG. 10).

In step S34, it is determined whether or not the process has timed out. In other words, it is determined whether or not the measured time T of the timer 24A reaches the timeout time T1. If the process has not timed out, the process returns to step S33. In this manner, the processes of steps S33 and S34 are repeatedly executed until the initialization process completion notification is received and the initialization process is successful (an affirmative determination in step S33), or the process times out and the initialization process fails (an affirmative determination in step S34). When the process times out and the initialization process fails, the process proceeds to step S47 (FIG. 10).

Returning to FIG. 10, in the process of step S45 (FIG. 9), the process proceeds to step S46 when the initialization process completion notification is received and the initialization process is successful, and, on the other hand, the process proceeds to step S47 when the process times out before the initialization process completion notification is received and the initialization process is a failure.

In step S46, the USB communication process is performed using bus power. Here, the term "USB communication process" indicates a process which the printer 11 performs with the host device 30 via USB communication while the power of the printer 11 is on, and, for example, includes a printing process and various notification processes including an ink remaining capacity notification. At this time, the USB communication process such as the printing process is performed using the second power (a current of 500 mA) which is supplied using bus power. Note that, if there is surplus power which is not used in the USB communication process of the second power, the surplus power may be used in the charging of the secondary cell 14 while the power is on.

Meanwhile, when the initialization process is a failure, in step S47, a value indicating failure is written to the memory, and the power mode is switched to self power. The CPU 24 writes a value (for example, "0") indicating failure, as illustrated in FIG. 6B, for example, to the second storage region 25B of the memory 25. Hereinafter, since the CPU 24 refers to the value in the memory 25 and determines whether the process is a failure or a success (step S42), the power mode is switched from bus power to self power by switching the value in the memory 25 to a value indicating failure. Note that, when the initialization process is successful in step S45, since a value (the initial value (for example, "1")) indicating success during the initial setting is stored in the second storage region 25B of the memory 25, in particular, re-writing is not performed. Naturally, a value indicating success may be written to the memory 25.

In the next step S48, the USB reconnection process is performed. In other words, the pull-up state is temporarily released, and the pull-up is subsequently performed again. Accordingly, the USB host 30A of the host device 30 detects the connection (the USB connection) with the USB device 11A while the USB cable 35 remains connected. As a result, it is possible to perform the initialization process between the host device 30 and the printer 11.

When the user setting is self power in this manner (step S41), when the value in the memory 25 is a value indicating failure (a negative determination in step S42), and when the initialization process fails during the bus power request (a negative determination in step S45), after performing the pull-up in all these cases (step S44 or step S48), the process proceeds to step S49.

In the next step S49, the initialization process (the second initialization process) which requests self power is executed. Here, the CPU 24 specifies the printer class in response to the request from the host device 30, and transmits the configuration information which requests self power to the host device 30 as a response. The initialization process which is performed when self power is requested is performed as illustrated in FIG. 2 in the same manner as the initialization process which is performed when bus power is requested. When the USB connection is detected due to the pull-up and the initialization process between the host device 30 and the printer 11 is started, the printer 11 transmits the configuration information which includes the class information "printer class", the power mode information "self power", and the requested power information (for example, a value within the range of 0 mA to 10 mA) as a response to the request "GetDescriptor" from the host device 30.

The host device 30 determines whether or not to allow the USB communication connection under the requested conditions based on the configuration information which is received from the printer 11, and since the result is self power, the host device 30 allows the establishment of USB communication. The host device 30 sets the device configuration and the like by writing the configuration information of the printer 11 to the memory, and as illustrated in FIG. 2, transmits the initialization process completion notification "SetConfiguration" to the printer 11. As a result, the initialization process is successful. Since the class information in the configuration information is the printer class, the host device 30 recognizes the USB device 11A as a printer. Therefore, if the host device 30 receives a print request, the host device 30 transmits the print data to the printer 11.

In step S50, the USB communication process is performed using self power. Since the power mode is self power, although there is no supply of power from the host device 30, if the print data is received from the host device 30, the printing process based on the print data is performed as one of the USB communication processes. At this time, if the printer 11 is connected to a power adapter such as the AC adapter 50, the printing operation is performed using the power which is supplied through the power adapter, and if the printer 11 is not connected to the power adapter, the printing process is performed using the power of the secondary cell 14.

In this manner, to begin with, the first initialization process which requests bus power is performed, and if the initialization process fails, since the power mode is switched to self power and the second initialization process which requests self power is performed, it is possible to establish USB communication between the printer 11 and the host device 30. Therefore, the user can cause the printer 11 to perform the printing process using an instruction from the host device 30. For example, when the CPU 24 performs the first initialization process and enters the standby state, unable to receive the initialization process completion notification, since USB communication will not connect no matter how long is waited, the user cannot cause the printer 11 to perform the printing process using an instruction from the host device 30.

However, according to the present embodiment, since the power mode is switched to self power when the initialization process fails and the initialization process is performed again, it is possible to cause the printer 11 and the host device 30 to connect by USB to each other more reliably. As a result, it is possible to avoid the inconvenience of being unable to print, and it is possible to cause the printer 11 to print using an instruction from the host device 30.

When the first initialization process which requests bus power in the charging process while the power is off fails, a value indicating the failure is stored in the memory 25, and, later, if the value which is read from the memory 25 when the power is on is a value which indicates failure, the second initialization process which requests self power is performed. Therefore, in comparison with a case in which an order is adopted in which the first initialization process is performed once, if the first initialization process fails, the power mode is switched to self power and the second initialization process is performed again, it is possible to establish USB communication between the printer 11 and the host device 30 quicker. Accordingly, the user can cause the printer 11 to perform the printing which is instructed from the host device 30 comparatively quickly after connecting the printer 11 and the host device 30 through the USB cable.

During the USB communication process, the CPU 24 performs the following processes. In other words, during the USB communication process, in step S51, the determination of whether or not the power off operation is performed, and in step S52, the determination of whether or not the USB cable is pulled out are repeatedly executed until an affirmative determination is obtained in one of the determination processes. For example, if the power on operation is performed in step S51, the process proceeds to step S53, and the power off process is performed. In other words, when the CPU 24 detects that the second switch 27 is turned on by the operation of the power switch 20A, the CPU 24 instructs the control IC 22 to disconnect the third switch 28. When the secondary cell 14 is used as the power, the CPU 24 instructs the control IC 22 to also disconnect the first switch 26. After the power off process ends, the CPU 24 causes the process to transition to the charging process routine when the power is off.

In step S52, when the USB cable is pulled out (an affirmative determination), the process proceeds to step 54, the memory 25 is rewritten with a value indicating "success", and the routine subsequently ends. Subsequently, if the printer 11 is connected to a power adapter such as the AC adapter 50, the printing operation is performed using the power which is supplied through the power adapter, and if the printer 11 is not connected to the power adapter, the printing process is performed using the power of the secondary cell 14. At this time, the USB communication between the printer 11 and the host device 30 is disconnected by the USB cable 35 being pulled out. Therefore, after the USB cable is pulled out and the connection with the host device 30 cuts out, when the USB connection with the host device 30 is connected, in the USB communication process routine (FIG. 10) which is restarted, since the value in the memory is "success" (an affirmative determination in step S42), the first initialization process (step S45) which requests bus power is performed.

When the power off operation is performed (an affirmative determination in step S51) in a state in which the connection with the host device 30 is continued without the USB cable 35 being pulled out (a negative determination in step S52), after the power off process (step S53), the process transitions to the charging process routine (FIG. 8) when the power is off. Accordingly, if the host device 30 and the printer 11 are reconnected to each other by the pull-up (step S13), and the value in the memory is "success" indicating that the first initialization process completed in the previous power-on state before the power turns off, the first initialization process is performed (step S45), and, on the other hand, if the value in the memory is "failure" indicating that the first initialization process fails and the second initialization process is being performed, the charging is not performed (step S17).

When the power is turned off with the USB cable 35 still connected in a state in which the initialization process which requests bus power fails, and USB communication is established by performing the initialization process using self power, a value indicating failure is stored in the memory 25. Therefore, in the charging process routine when the power is off illustrated in FIG. 8, since the value in the memory 25 is a value indicating failure (a negative determination in step S12), the charging activation is turned off (step S17). At this time, since information indicating the failure of the initialization process which is intended to perform the USB communication process while the power of the printer 11 is on is used, the charging activation is turned off without attempting the first initialization process. For example, when the first initialization process is performed, it is possible to suppress the wasting of power and the depletion of the remaining capacity of the secondary cell 14 caused by the CPU 24 continually waiting for the initialization process completion notification which will not be transmitted until the process times out.

According to the present embodiment described in detail above, it is possible to obtain the following effects.

(1) If the partner to which the USB connector 12 is connected is the USB battery charger 40 (an example of the first device) when the power switch 20A is in the off state, the control circuit 13 charges the secondary cell 14 using the power that is received by the USB connector 12 without performing the initialization process (the enumeration). If the partner to which the USB connector 12 is connected is the host device 30 (an example of the second device), the control circuit 13 performs the initialization process and, after the initialization process is completed, charges the secondary cell 14. Meanwhile, when the partner to which the USB connector 12 is connected is the host device 30 and the initialization process fails, the charging of the secondary cell 14 is not performed. Accordingly, when the partner to which the USB connector 12 is connected is the host device 30 and the initialization process fails when the power switch 20A is in the off state, it is possible to turn off the power of the control circuit 13 (in particular, the CPU 24), and it is possible to stop the charging to the secondary cell 14 before the charging starts. Therefore, it is possible to suppress the wasting of electricity and the depletion of the remaining capacity of the secondary cell 14 caused by the control circuit 13 being left in the active state for a long time, even if the initialization process fails.

(2) The control circuit 13 is provided with the control IC 22 (an example of the determination circuit) which determines the partner to which the USB connector 12 is connected, and the CPU 24 (an example of the processing circuit) which executes at least a portion of the initialization process. If the partner to which the USB connector 12 is connected is determined to be the USB battery charger 40 (an example of the first device), the CPU 24 is maintained in the power-off state. If the partner to which the USB connector 12 is connected is determined to be the host device 30 (an example of the second device), the CPU 24 transitions to the power-on state. Therefore, the CPU 24 which transitions to the power-on state can perform the initialization process with the host device 30.

(3) In the initial state, when the USB connector 12 is connected to the host device 30 when the power switch 20A is in the on state, the control circuit 13 performs the first initialization process (the initialization process which requests bus power) including a request for a supply of power greater than in the second initialization process (the initialization process which requests self power). After the first initialization process completes (succeeds), the charging to the secondary cell 14 is performed. The charging is performed using a relatively large power (the second power) which is supplied after the first initialization process is completed. In other words, the charging is performed by receiving a supply of a larger power (the second power) than a relatively small power (including a case in which the supply of power is zero) which is supplied after the second initialization process is completed. Meanwhile, when the first initialization process cannot be completed and fails, the control circuit 13 performs the second initialization process which requests a smaller supply of power. Accordingly, even if the first initialization process fails, it is possible to complete the second initialization process. Therefore, the control circuit 13 can establish communication with the host device 30 via the USB connector 12. After completion of the second initialization process is achieved, since the charging of the secondary cell 14 is not performed using the small supply of power, despite the supply of power being small, it is comparatively easy for the printer 11 to secure the power to perform processes such as the printing process.

(4) After performing the second initialization process, when the connection with the host device 30 is continued, the control circuit 13 performs the second initialization process without performing the first initialization process. Meanwhile, after performing the second initialization process, when the printer 11 connects to the host device 30 after the connection with the host device 30 cuts out, the control circuit 13 returns to the initial state and starts the first initialization process. When the host device 30 is the same connection partner for which the first initialization process has failed once in this manner, the second initialization process is performed without performing the first initialization process. Therefore, it is possible to suppress the wasting of power caused by the control circuit 13 performing the first initialization process with the same host device 30 for which the first initialization process has already failed once. Meanwhile, after performing the second initialization process, when the control circuit 13 connects to the host device 30 after the connection with the host device 30 cuts out, the control circuit 13 returns to the initial state and performs the first initialization process. When there is a likelihood that the connection partner of the control circuit 13 is the host device 30 which differs from a host device for which the first initialization process has already failed once, the control circuit 13 returns to the initial state, and the first initialization process is performed. At this time, if the first initialization process is successful, it is possible to perform the charging of the secondary cell 14 using the power which is supplied from the host device 30. Accordingly, it is possible to increase the frequency with which the secondary cell 14 is charged.

(5) After the first initialization process is completed, when the power switch 20A is turned off in a state in which the connection with the host device 30 is continued, the control circuit 13 performs the first initialization process, and after the first initialization process is completed, performs the charging of the secondary cell 14. In this manner, in the power-on state, the first initialization process is performed with the same host device 30 for which the first initialization process succeeded after the power is turned off. Therefore, if the first initialization process is completed, the secondary cell 14 is charged, and if the first initialization process fails, the charging of the secondary cell 14 is not performed. Meanwhile, after the second initialization process is performed, when the power switch 20A is turned off in a state in which the connection with the host device 30 is continued, the control circuit 13 does not perform the first initialization process, and does not perform the charging of the secondary cell 14. In this manner, when the first initialization process fails in the power-on state and the second initialization process is performed, the charging of the secondary cell 14 is not performed by not performing the first initialization process with the same host device 30 for which the first initialization process fails after the power is turned off. Accordingly, when the power switch 20A is turned off, it is possible to suppress the wasting of power caused by the control circuit 13 performing the first initialization process with the same host device 30 for which the first initialization process has already failed once.

(6) The control circuit 13 stores a value indicating success in which completion of the first initialization process which is performed in the off state before the power switch 20A is turned on is achieved, or indicating failure in which completion of the first initialization process is not achieved and the second initialization process is performed in the non-volatile memory 25. If the stored content of the second storage region 25B of the non-volatile memory 25 is a value indicating success after the power switch 20A is turned on, the first initialization process is performed. Meanwhile, if the stored content of the second storage region 25B of the non-volatile memory 25 is a value indicating failure, the second initialization process is performed without performing the first initialization process, and the charging of the secondary cell 14 is not performed. Accordingly, when the power switch 20A is turned on in a state in which the connection with the host device 30 is continued after the first initialization process fails, it is possible to suppress the wasting of power caused by the control circuit 13 performing the first initialization process with the same host device 30 for which the process has already failed once in the power-off state.

(7) When the USB connector 12 is connected to the host device 30 in the initial state, the control circuit 13 performs the first initialization process, and, after the first initialization process is completed, performs the charging to the secondary cell 14. When the first initialization process fails, the charging to the secondary cell 14 is not performed. When the reconnection with the host device 30 is performed in a state in which the connection with the host device 30 is continued after the first initialization process is completed, the control circuit 13 performs the first initialization process, and after the first initialization process is completed, performs the charging to the secondary cell 14. Meanwhile, when the reconnection with the host device 30 is performed in a state in which the connection with the host device 30 is continued after the first initialization process fails, the control circuit 13 does not perform the first initialization process, and does not perform the charging to the cell. Accordingly, when reconnection is performed with the same host device 30 for which the first initialization process has already failed, it is possible to suppress the wasting of power caused by the control circuit 13 performing the first initialization process with the same host device 30 for which the first initialization process has already failed.

(8) When the control circuit 13 connects to the host device 30 after the connection with the host device 30 cuts out, the control circuit 13 returns to the initial state and starts the first initialization process regardless of whether the first initialization process completes (succeeds) or fails before the connection with the host device 30 cuts out. Accordingly, when the control circuit 13 connects to the host device 30 after the connection with the host device 30 cuts out, since there is a likelihood that the connection partner is different from the host device 30 before the connection cuts out (a likelihood that the first initialization process succeeds), the control circuit 13 returns to the initial state and the first initialization process is performed. If the first initialization process succeeds, it is possible to charge the secondary cell 14. For example, it is possible to avoid not performing the first initialization process and missing a charging opportunity, even though there is a likelihood that the connection with the host device 30 for which the first initialization process failed will cut off and the host device 30 which is connected next is different from the host device until that point. Accordingly, it is possible to increase the frequency with which the secondary cell 14 is charged.

(9) If the power of the printer 11 is in the on state, the control circuit 13 performs the first initialization process as a printer by transmitting a notification of the class information (the printer class (first class)) indicating that the device is a printer (an example of the first type device). Meanwhile, if the power of the printer 11 is in the off state, the control circuit 13 performs the first initialization process as an HID by transmitting a notification of the class information (the HID class (second class)) indicating that the device is a human interface device (HID) (an example of the second type device) which is different from a printer. Accordingly, the host device 30 recognizes the printer 11 in the power-on state as a printer, and treats the printer 11 as a printer. Meanwhile, the host device 30 recognizes the printer 11 in the power-off state as an HID, and treats the printer 11 as an HID. Accordingly, it is possible to avoid the inconvenience of recognizing the printer 11 in the power-on state as an HID and becoming unable to print, and to avoid the inconvenience of recognizing the printer 11 in the power-odd state as a printer and transmitting print data thereto regardless of the fact that the printer 11 is in the power-off state, and the like.

(10) When the first initialization process which is performed when the power of the printer 11 is in the on state fails, the control circuit 13 performs the second initialization process which includes a request for a smaller supply of power than the first initialization process. When the reconnection with the host device 30 is performed in a state in which the connection with the host device 30 is continued after the second initialization process completes, if the power of the printer 11 is in the on state, the second initialization process is performed without performing the first initialization process. Accordingly, when the reconnection with the host device 30 is performed in a state in which the connection with the host device 30 is continued after the second initialization process completes, the second initialization process is performed without performing the first initialization process which already failed once with the same host device 30. Accordingly, it is possible to suppress the wasting of power caused by the control circuit 13 performing the first initialization process which has already failed once, and a state is assumed in which it is possible to start printing earlier by the amount saved by omitting the first initialization process, and it is possible to start the printing earlier after the reconnection.

(11) When a timeout occurs in the initialization process with the host device 30, the control circuit 13 determines that the first initialization process is a failure. Therefore, since it is possible to perform the second initialization process earlier in comparison with when a configuration is adopted in which the control circuit 13 waits until receiving the initialization process completion notification without considering the timeout, it is possible to establish the communication between the host device 30 and the printer 11 early.

(12) The control circuit 13 sets the timeout time T1 which is used when determining the timeout according to the BIOS necessary activation time (an example of the necessary activation time) of the host device 30. Accordingly, even if the host device 30 to which the USB connector 12 is connected is in a mid-activation state, it is possible to charge the secondary cell 14 using the second power (for example, a current of 500 mA) which is supplied using the power from the host device 30 by performing the initialization process with the host device 30 after the activation. Therefore, it is possible to reduce the occurrence of an inconvenience in which it is determined that the process times out in the middle of the activation of the host device 30 due to a timeout time which does not correspond to the necessary activation time of the host device 30 and is too short being set, and the charging is not performed due to the failure being determined slightly too early regardless of the fact that it is possible to perform the charging if the process waits a little. Therefore, it is possible to increase the frequency with which the secondary cell 14 is charged.

(13) In particular, the timeout time T1 is set to the longest time of the necessary activation times of a plurality of the host devices 30 which are anticipated to be connected with a predetermined margin time added thereto. Accordingly, it is possible to suppress, to the greatest degree possible, a situation in which it becomes impossible to charge the secondary cell 14 due to the process timing out mid-activation of the host device 30 due to a timeout time which is too short being set regardless of the fact that it is possible to perform the charging if the process waits a little, and the first initialization process is determined to be a failure. Therefore, it is possible to further increase the frequency with which the secondary cell 14 is charged.

(14) The timeout time T12 when the power is on is set shorter than the timeout time T11 in the initialization process when the power is off. Accordingly, it is possible to increase the frequency with which the secondary cell 14 is charged while the power is off, and it is possible to suppress a delay in starting the process which the user instructs from the host device 30 to the printer 11 while the power is on to a short delay.

Second Embodiment

Next, description will be given of the second embodiment with reference to FIG. 11. In the present embodiment, the CPU 24 determines that the first initialization process is a failure by another method in addition to the timeout. Note that, since the configuration of the printer 11 is the same as that of the first embodiment, and only a portion of the method of determining the failure of the initialization process which is executed by the CPU 24 is different, configurations and processes which are shared with the first embodiment will be assigned the same reference numerals, description thereof will be omitted, and only portions which are particularly different will be described.

In the present embodiment, the failure of the initialization process is determined by the host device 30 transitioning into a suspend state, in addition to being determined by the generation of the timeout in the same manner as in the first embodiment. Depending on the type of the host device 30, during the USB connection, a start of frame (SOF) signal is transmitted to the printer 11 periodically (for example, every predetermined time of less than 1 millisecond). The SOF signal is, for example, a signal which is transmitted from the host device 30 to the printer 11 every interval of a fixed time To within a range of 10 microseconds to 1 millisecond.

Therefore, even during the initialization process, the SOF signal is transmitted from the host device 30 to the printer 11. When the host device 30 cannot allow the requested power (the second power) using bus power included in the configuration information which is received from the printer 11 in the first initialization process, the setting of the configuration information is not performed, and the host device 30 transitions to the suspend state. Therefore, when transitioning to the suspend state, the host device 30 stops transmitting the SOF signal to the printer 11.

When the SOF signals which should be transmitted from the host device 30 during the USB connection with the host device 30 are cut off and are not longer transmitted, the host device 30 transitions to the suspend state, and the CPU 24 which configures the control circuit 13 in the printer 11 assumes that the first initialization process is a failure. In the charging process when the power is off, when the SOF signals which should be transmitted from the host device 30 are cut off and are not longer transmitted during a set time T2, the host device 30 transitions to the suspend state, and the CPU 24 assumes that the first initialization process is a failure.

In this case, if the charging process (FIG. 8) is underway when the power is off, when the first initialization process fails, a value indicating failure is written to the non-volatile memory 25 (step S16), and the power of the CPU 24 is subsequently turned off (charging activation off in step S17). If the USB communication process (FIG. 10) is underway when the power is on, when the first initialization process fails, a value indicating failure is written to the non-volatile memory 25, the power mode switches to self power (step S47), the reconnection process is performed (step S48), and the second initialization process which requests self power is subsequently executed (step S49).

The set time T2 is, for example, set to a fixed time which is within a range of 1 millisecond to 10 milliseconds and satisfies T2>To. In other words, the first initialization process is determined to be a failure at the point in time at which the SOF signals cut out and the idle state is assumed for the set time T2 or longer.

Next, description will be given of the operations of the printer 11 of the present embodiment, with reference to FIG. 11. The processes of steps S31 to S34 in FIG. 11 are the same as the processes of steps S31 to S34 illustrated in FIG. 9 in the first embodiment.

In step S31, the timer starts measuring the time. In step S32, the initialization process (the first initialization process) which requests bus power is performed, and the configuration information containing the class information (for example, "HID"), the power mode information ("bus power"), and the requested power information ("the second power (a current of 500 mA)") is transmitted in response to the request from the host device 30.

In step S33, it is determined whether or not the initialization process completion notification is received. Here, the host device 30 determines whether or not it is possible to allow the supply of power using the second power which is requested in the configuration information which is received in the initialization process. When it is possible to allow the supply of power using the second power, the host device 30 sets the configuration information, and transmits the initialization process completion notification "SetConfiguration" to the printer 11. If the CPU 24 of the printer 11 does not receive the initialization process completion notification, the process proceeds to step S34, and if the CPU 24 receives the initialization process completion notification and the first initialization process is successful, the process proceeds to step S15 (the charging process routine of FIG. 8) or step S46 (the USB communication process routine of FIG. 10).

When the initialization process completion notification is not received (a negative determination in step S33), in step S34, it is determined whether or not the process has timed out. In other words, it is determined whether or not the measured time T of the timer 24A reaches the timeout time T1. If the process has not timed out, the process proceeds to step S35. Meanwhile, if the process has timed out, the first initialization process is assumed to be a failure, and the process proceeds to step S16 (the charging process routine of FIG. 8) or step S47 (the USB communication process routine of FIG. 10).

In step S35, it is determined whether or not none of the received SOF signals is the set time T2 or longer. In other words, the CPU 24 determines whether or not an idle state is assumed in which the reception of the SOF signals which should be transmitted from the host device 30 during the USB connection cuts out for the set time T2 or longer. If the idle state in which the reception of the SOF signals cuts out does not reach the set time T2, the process returns to step S33, and if the idle state continues for the set time T2 or longer, it is assumed that the first initialization process is a failure, and the process proceeds to step S16 (FIG. 8) or step S47 (FIG. 10).

The processes of steps S33, S34, and S35 are repeated until one of the determination processes of whether the initialization process completion notification is received (step S33), whether the process times out (step S34), or whether the SOF signals are not received for the set time T2 or longer (step S35) is satisfied.

If the initialization process completion notification is received (an affirmative determination in step S33) without the reception of the SOF signals cutting out for the set time T2 or longer (a negative determination in step S35) before the process times out (a negative determination in step S34), the first initialization process is completed, and therefore, the first initialization process is successful. When the first initialization process is successful, if the charging process is underway when the power is off, the process proceeds to step S15, and the secondary cell 14 is charged using the second power. Meanwhile, if the USB communication process is underway when the power is on, the process proceeds to step S46, and the USB communication process and the charging are performed.

Meanwhile, when the reception of the SOF signals cuts out for the set time T2 or longer (an affirmative determination in step S35) without receiving the initialization process completion notification (a negative determination in step S33) before the process times out (a negative determination in step S34), the first initialization process is assumed to be a failure. When the process times out (an affirmative determination in step S34) without receiving the initialization process completion notification (a negative determination in step S33), and without the reception of the SOF signals cutting out for the set time T2 or longer (a negative determination in step S35), the first initialization process is assumed to be a failure. When the first initialization process fails, if the charging process (FIG. 8) is underway when the power is off, a value indicating failure is written to the non-volatile memory 25 (step S16), and the charging activation of the CPU 24 is turned off (step S17). Meanwhile, if the USB communication process (FIG. 10) is underway when the power is on, the process proceeds to step S46, and the USB communication process and the charging are performed.

According to the second embodiment, it is possible to obtain the same effects as in the first embodiment, and it is further possible to obtain the effects described hereinafter.

(15) When the SOF signals which should be transmitted periodically from the host device 30 during the USB connection stop for the set time T2 or longer, the CPU 24 of the printer 11 determines that the first initialization process is a failure. Therefore, the failure of the first initialization process can be detected in substantially real time without waiting for the timeout time T1 from the activation time of the CPU 24. Therefore, in the charging process when the power is off, it is possible to detect the failure of the first initialization process early without waiting for the timeout, and to turn off the charging activation of the CPU 24 and the like early when the failure is detected. Therefore, in comparison with a configuration in which the failure of the first initialization process is determined based on the timeout, it is possible to further suppress the wasting of the power by the CPU 24 and the like. For example, it is possible to further suppress the depletion of the remaining capacity of the secondary cell 14 caused by the control circuit 13 being left in the active state. In the USB communication process when the power is on, it is possible to detect the failure of the first initialization process early without waiting for the timeout, and to start the initialization process (the second initialization process) which requests self power early. As a result, the printer 11 can start the USB communication process early in comparison to the configuration of the first embodiment in which only the timeout is used for the failure. For example, it is possible to cause the printer 11 to start the printing which the user instructs from the host device 30 early.

(16) A plurality of determination methods are used for the determination method of the failure of the first initialization process. The determination methods include determining whether or not there are no SOF signals which should be transmitted periodically from the host device 30 for the set time T2 or longer, and determining whether or not the timeout time T1 has elapsed from the activation time of the CPU 24. Accordingly, when a host device which includes a function of transmitting the SOF signals is the connection partner, it is possible to detect a failure of the first initialization process substantially in real time, and it is possible to detect the failure of the first initialization process based on the timeout, even if the host device does not have the function of transmitting the SOF signals.

Note that, the embodiments described above can also be modified to the forms described below, combined, and the like.

A configuration may be adopted in which the timeout time can be changed according to the operational environment of the user. A configuration may be adopted in which the operation switches 20B are provided as an example of the operation unit which is operated in order to input data, and the control circuit 13 can set the timeout time T1 which is used when determining that the process has timed out based on an input result by the operation of the operation switches 20B. In this case, a configuration may be adopted in which the timeout time T1 is input and set as a numerical value by the operation of the operation switches 20B, and a configuration may be adopted in which a desirable choice is chosen from among the choices of the timeout time T1. In this case, the user can set an appropriate timeout time T1 to match the usage environment based on the input results of operating the operation switches 20B. Accordingly, it is possible to reduce the occurrence of an inconvenience in which it is determined that the process times out in the middle of the activation of the host device 30 due to the failure being determined slightly too early regardless of the fact that it is possible to perform the charging if the process waits a little due to a timeout time which does not correspond to the BIOS necessary activation time of the host device 30 which is used and is too short being set in a non-changeable state, and the charging is not performed. As a result, it is possible to increase the frequency with which the secondary cell 14 is charged.

The timeout time T1 is set to a fixed value; however the timeout time may be variable. A configuration may be adopted in which, when the partner to which the USB connector 12 is connected is the host device 30 which is an example of the second device, the control circuit 13 acquires the necessary activation time by acquiring the necessary activation time from the host device 30, or by measuring the necessary activation time of the host device 30 using a timer inside the control circuit 13, the timeout time T1 is set according to the acquired necessary activation time. In this case, since the control circuit 13 can set the timeout time T1 according to the acquired necessary activation time, it is possible to set an appropriate timeout time T1 to match the usage environment of the user. Therefore, it is possible to reduce the occurrence of an inconvenience in which it is determined that the process times out in the middle of the activation of the host device 30 due to a timeout time which does not correspond to the necessary activation time of the host device 30 and is too short being set, and the charging is not performed due to the process timing out (failing) slightly too early regardless of the fact that it is possible to perform the charging if the process waits a little. As a result, it is possible to increase the frequency with which the secondary cell 14 is charged. The control circuit 13 stores the data of the maximum M necessary activation times in the memory 25, erases the oldest data of the past data exceeding M every time a new necessary activation time is acquired, and sets the timeout time according to the longest necessary activation time of the M items. A configuration may be adopted in which the timeout time T1 is set according to the longest necessary activation time of the data of the necessary activation times which are equal to or shorter than the longest set time, without adopting the data which exceeds the longest set time which is set in advance, of the past M items. In these cases, it is possible to avoid an excessively long timeout time being set based on the excessively long necessary activation time of the host device 30 due to the user connecting a host device 30 that has an extremely long necessary activation time to the printer 11 one time by chance, and it is possible to set an appropriate timeout time T1.

A configuration may be adopted in which the control circuit 13 measures a value indicating the remaining capacity or the change in the remaining capacity of the secondary cell 14, and, when the value indicating the remaining capacity or the change in the remaining capacity of the secondary cell 14 exceeds a threshold, the control circuit 13 determines the initialization process to be a failure. In this case, the value indicating the change in the remaining capacity of the secondary cell may be a change amount, and may be a change rate. In this case, the control circuit 13 determines that the initialization process is a failure based on the fact that the value indicating the remaining capacity or the change in the remaining capacity of the secondary cell 14 (for example, the change amount or the change rate) has exceeded the threshold. Therefore, it is possible to determine that the initialization process is a failure without using a time measurement unit such as a timer. When the change rate of the remaining capacity is used, the initialization process is determined to be a failure relatively soon when the remaining capacity of the secondary cell 14 is relatively little, and the initialization process is determined to be a failure relatively late when the remaining capacity of the secondary cell 14 is relatively great. Therefore, it is easy to avoid a situation in which the determination of the failure of the initialization process is delayed and the remaining capacity becomes extremely little regardless of the remaining capacity of the secondary cell 14 being little. A configuration may be adopted in which, when the timeout time T1 is set according to the remaining capacity of the secondary cell 14, for example, when the remaining capacity of the secondary cell 14 is little such as less than the threshold, the timeout time T1 is set relatively short, and when the remaining capacity is great, the timeout time T1 is set relatively long.

It is preferable to set the timeout time T1 to a value according to the longest necessary activation time (BIOS necessary activation time) of plural type of the host device 30 which are anticipated to be connected. However, the timeout time T1 may be set to the same time as the BIOS necessary activation time or to a time which is shorter than the BIOS necessary activation time of a host device. For example, ½ or ⅓ of the time of the BIOS necessary activation time may be used. A timeout time T1 which does not take the BIOS necessary activation time into consideration may also be set. For example, the timeout time T1 may be set to a value which is greater than or equal to the time necessary for enumeration and is less than or equal to a time obtained by adding a predetermined margin time (for example, 1 second to 10 seconds) to the time necessary for enumeration.

The time measurement starting time of the measured time T is not limited to being the activation time of the CPU (the charging activation on time). For example, the time measurement of the timer 24A may be started at the time of USB connection (for example, the time at which the USB connection is detected). In this case, for example, if the measurement of time is performed by the timer (for example a counter) within the control IC 22, it is possible to start the time measurement, even before the activation of the CPU. The time measurement of the timer may be started when a predetermined time has elapsed from the CPU activation time. For example, the time measurement by the timer may be started from the transmission time of the configuration information.

Figure 11:
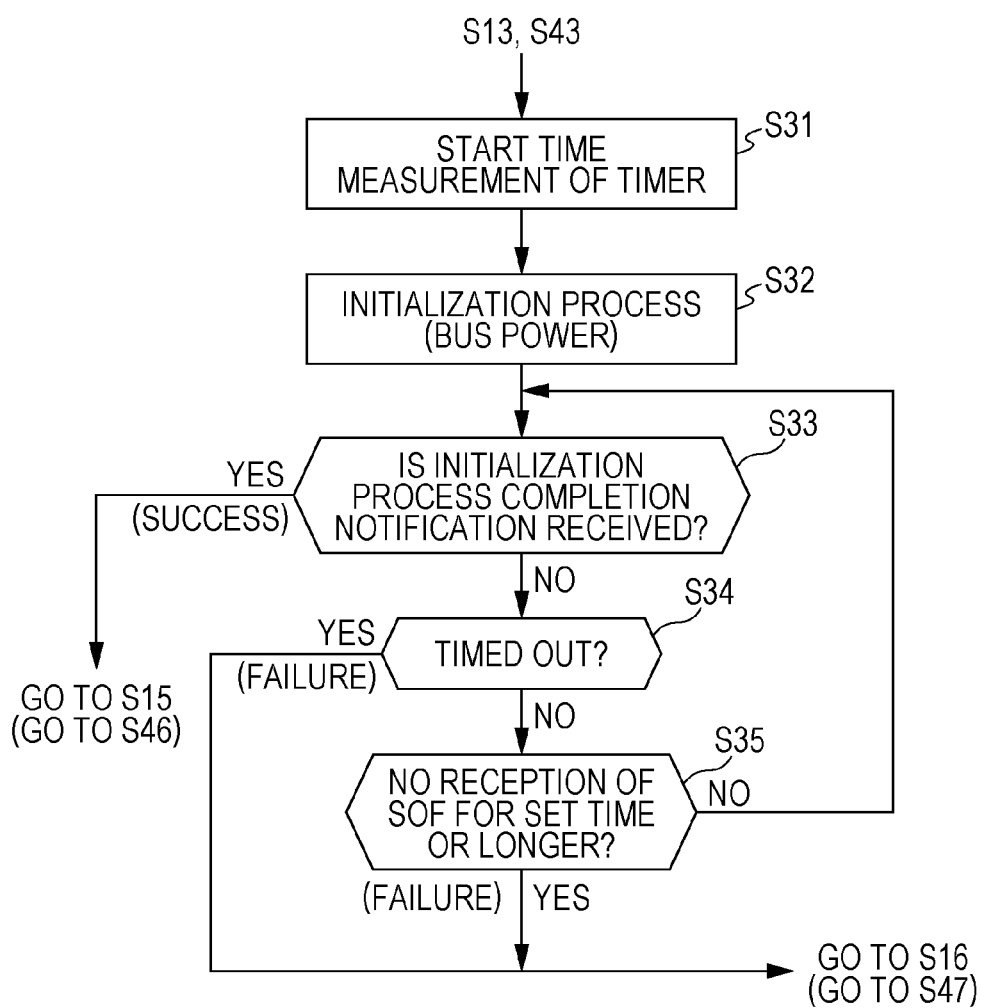
FIG. 11 is a flowchart illustrating the initialization process when the bus power is requested in a second embodiment.

In the second embodiment, if the premise is that the host device 30 transmits the SOF signal periodically to the USB device 11A during the USB connection, the process (step S34) which determines whether or not the process has timed out in the flowchart illustrated in FIG. 11 may be removed.

If the initial state is bus power, the user setting which sets the power mode by the operation of the operation switches 20B may be omitted. The configuration in which a value indicating the success or the failure of the first initialization process is stored in non-volatile memory may be removed. In this case, with regard to the initialization process, the first initialization process is performed first, and if the first initialization process fails, the second initialization process is performed.

In FIG. 10, the USB communication process and the charging are performed while the power is on. However, a configuration may be adopted in which the charging is not performed.

In the embodiments described above, the first initialization process requests bus power and the second initialization process requests self power. However, a configuration may be adopted in which both the first initialization process and the second initialization process request bus power, and the second initialization process includes a request for a supply of power which is less than in the first initialization process. For example, the first initialization process may use bus power at 500 mA, and the second initialization process may be bus power as 100 mA.

The power which the electronic device receives a supply of from the external device is not limited to being used in the charging of the secondary cell 14. When the electronic device is a printer, for example, the power which is supplied from the external device may be used for a printing operation of the printing mechanism 16, for example. When the electronic device is a scanner, for example, the power which is supplied from the external device may be used in a document reading operation, for example.

When the power is switched from on to off, or from off to on, even if the control circuit continues the connection with the external device, the initial state may be restored.

The USB standard is not limited to USB 2.0, and an embodiment of the invention may be applied to USB 3.0 or USB 3.1. An embodiment of the invention may be applied to USB 1.0 or USB 1.1. An embodiment of the invention is not limited to the USB standard, and may be applied to another communication standard. In summary, another communication standard may be used as long as the communication standard has a configuration in which the initialization process is performed between the host device and the electronic device, the initialization process is completed using the reception of the initialization process completion notification (a notification corresponding to "Set Configuration" of the USB standard) as a trigger, and the supply of power which is necessary for the charging is received from the host device based on the completion of the initialization process. For example, the communication standard may be IEEE 1394, small computer system interface (SCSI), or advanced technology attachment (ATA). The communication system is not limited to a wired communication system, and may be a wireless communication system as long as it is possible to supply power from the host device to the electronic device.

The power switch 20A is not limited to the push type, and may be torque type. Additionally, the power switch 20A may be a switch which can be operated to switch the power between on and off. The power switch 20A may be a sensor type power switch, and may be a contact sensor type or a non-contact type of power switch.

The control circuit is configured to include the control IC 22 which is configured using hardware, and software using a CPU which executes a program. However, the control circuit may be realized using hardware using an electronic circuit such as the control IC 22 or an ASIC, and may be realized using only software.

The printer (the printing device) is not limited to a dedicated printer, and may be a multi-function device provided with a copying function and a scanning function. In addition to a serial printer or a line printer, the printer may be a page printer. The printer may be a portable, compact, or medium printer, and may be a large printer. For example, the printer may be a business printer or a large format printer.

The electronic device is not limited to a printer (including a multi-function device), and may be a scanner, a projector, a digital camera (an imaging device), a digital audio device (a music device), or the like.

What is claimed is:

1. An electronic device, comprising:
a communication circuit which connects to an external device, performs communication, and receives a supply of power; and
a control circuit,
wherein,
when the communication circuit connects to the external device in an initial state, the control circuit performs a first initialization process and receives the supply of power from the external device after the first initialization process is completed, and
when the first initialization process fails, the control circuit does not receive the supply of power from the external device; and
a power switch,
wherein a connection with the external device is performed with the power switch in an on state, and
wherein, when the first initialization process fails, the control circuit performs a second initialization process and the first initialization process includes a request for a supply of power which is greater than in the second initialization process without receiving the supply of power from the external device,
wherein, when a connection with the external device is continued after performing the second initialization process, the control circuit performs the second initialization process without performing the first initialization process, and
wherein, when the control circuit connects to the external device after the connection with the external device cuts out after performing the second initialization process, the control circuit returns to an initial state and starts the first initialization process.

2. The electronic device according to claim 1, further comprising:
a power switch,
wherein, when the power switch is in an off state and the communication circuit connects to the external device,
if a partner to which the communication circuit is connected is a first type device, the control circuit performs charging of a chargeable cell using power received by the communication circuit without performing the first initialization process,
if the partner to which the communication circuit is connected is a second type device, the control circuit performs the first initialization process and performs charging of the cell after the first initialization process is completed, and
if the partner to which the communication circuit is connected is a second type device, when the first initialization process fails, the control circuit does not perform charging of the cell.

3. The electronic device according to claim 1, further comprising:
a power switch,
wherein, when the power switch is in an on state and the communication circuit connects to the external device,
when the first initialization process fails, the control circuit performs a second initialization process and does not receive the supply of power from the external device, and
wherein the second initialization process includes a request for less power than the first initialization process.

4. The electronic device according to claim 1,
wherein, when the communication circuit connects to the external device in an initial state,
when the control circuit performs reconnection with the external device in a state in which the first initialization process is completed and the connection with the external device is continued, the control circuit performs the first initialization process and receives the supply of power from the external device after the first initialization process is completed, and
when the control circuit performs reconnection with the external device in a state in which the first initialization process fails and the connection with the external device is continued, the control circuit does not perform the first initialization process and does not receive the supply of power from the external device.

5. The electronic device according to claim 2,
wherein the control circuit is provided with a determination circuit which determines the partner to which the communication circuit is connected, and a processing circuit which executes at least a portion of the initialization process,
wherein, when the processing circuit operates, power consumed is greater than or equal to the power received by the communication circuit before the initialization process is completed,
wherein, when the power switch is in the off state and the communication circuit connects to the external device, the determination circuit operates using the power which is received by the communication circuit before the initialization process and determines the partner to which the communication circuit is connected,
if the determination circuit determines that the partner to which the communication circuit is connected is the first type device, the processing circuit is maintained in the power-off state, and
if the determination circuit determines that the partner to which the communication circuit is connected is the second type device, the processing circuit is caused to transition to the power-on state.

6. The electronic device according to claim 2,
wherein, when a timeout occurs in the initialization process with the second type device, the control circuit determines the initialization process to be a failure.

7. The electronic device according to claim 2,
wherein the control circuit determines the initialization process to be a failure due to a signal which should be transmitted periodically from the second type device no longer being transmitted.

8. The electronic device according to claim 6,
wherein the control circuit sets a timeout time which is used when determining the timeout according to a necessary activation time of the second type device.

9. The electronic device according to claim 6, further comprising:
an operation unit which is operated in order to input data,
wherein the control circuit sets a timeout time which is used when determining an occurrence of the timeout based on operation of the operation unit.

10. The electronic device according to claim 6,
wherein, when the external device which is connected to the communication circuit is the second type device, the control circuit acquires a necessary activation time of the second type device and sets a timeout time which is used when determining an occurrence of the timeout to a value corresponding to the necessary activation time.

11. The electronic device according to claim 1,
wherein the control circuit measures a value indicating a remaining capacity or a change in the remaining capacity of the cell, and, when the value indicating the remaining capacity or the change in the remaining capacity of the cell exceeds a threshold, the control circuit determines the initialization process to be a failure.

12. The electronic device according to claim 1,
wherein, when the power switch is turned off in a state in which the connection with the external device is continued after the first initialization process is completed, the control circuit performs the first initialization process, subsequently receives the supply of power from the external device and performs charging of the cell after the first initialization process is completed, and, when the first initialization process fails, the control circuit does not perform charging of the cell, and
meanwhile, when the power switch is turned off in a state in which the connection with the external device is continued after performing the second initialization process, the control circuit does not charge the cell by not performing the first initialization process.

13. The electronic device according to claim 1,
wherein the control circuit is provided with a non-volatile memory which stores a value indicating either success in which completion of the first initialization process is achieved, or failure in which completion of the first initialization process is not achieved and the second initialization process is performed, when the power switch is in an off state before being turned on, and
wherein, if the value stored in the non-volatile memory is a value indicating success after the power switch is turned on, the control circuit performs the first initialization process, and if the value stored in the nonvolatile memory is a value indicating failure, the control circuit performs the second initialization process without performing the first initialization process, and the control circuit does not receive the supply of power from the external device.

14. The electronic device according to claim 1, wherein, when a timeout occurs in the first initialization process, the control circuit determines the first initialization process to be a failure.

15. The electronic device according to claim 14, wherein the control circuit sets a timeout time which is used when determining the timeout such that a value when the power switch is in the on state is shorter than a value when the power switch is in the off state.

16. The electronic device according to claim 1, wherein charging of a cell is performed using the supply of power which is received from the external device.

17. The electronic device according to claim 4, wherein, when the control circuit connects to the external device after a connection with the external device cuts out, the control circuit returns to the initial state and starts the first initialization process regardless of whether the first initialization process completes or fails before the connection with the external device cuts out.

18. The electronic device according to claim 4, further comprising:
a power switch,
wherein, if the power switch is in an on state, the control circuit performs the first initialization process as a first type device, and, if the power switch is in the off state, the control circuit performs the first initialization process as a second type device which differs from the first type device.

19. The electronic device according to claim 3, wherein, when a reconnection with the external device is performed in a state in which the connection with the external device is continued after the second initialization process completes, if the power is in the on state, the control circuit performs the second initialization process without performing the first initialization process.

* * * * *